US012630729B2

(12) United States Patent
Hanazawa et al.

(10) Patent No.: US 12,630,729 B2
(45) Date of Patent: May 19, 2026

(54) INK, PRINTING APPARATUS, PRINTING METHOD, AND PRINTED MATTER

(71) Applicants: Atsufumi Hanazawa, Tokyo (JP); Tomohiro Inoue, Kanagawa (JP); Michihiko Namba, Kanagawa (JP); Takashi Tamai, Kanagawa (JP); Ryo Kawamura, Kanagawa (JP); Satoyuki Sekiguchi, Kanagawa (JP); Shunsuke Kobayashi, Kanagawa (JP); Kimiharu Yamazaki, Kanagawa (JP); Hideaki Nishimura, Kanagawa (JP)

(72) Inventors: Atsufumi Hanazawa, Tokyo (JP); Tomohiro Inoue, Kanagawa (JP); Michihiko Namba, Kanagawa (JP); Takashi Tamai, Kanagawa (JP); Ryo Kawamura, Kanagawa (JP); Satoyuki Sekiguchi, Kanagawa (JP); Shunsuke Kobayashi, Kanagawa (JP); Kimiharu Yamazaki, Kanagawa (JP); Hideaki Nishimura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/416,900

(22) Filed: Jan. 19, 2024

(65) Prior Publication Data

US 2024/0254350 A1 Aug. 1, 2024

(30) Foreign Application Priority Data

Jan. 20, 2023 (JP) ................................ 2023-007341

(51) Int. Cl.
*C09D 11/322* (2014.01)
*B41J 2/175* (2006.01)
(Continued)

(52) U.S. Cl.
CPC ......... *C09D 11/322* (2013.01); *B41J 2/17596* (2013.01); *C09D 11/033* (2013.01); *C09D 11/037* (2013.01); *C09D 11/36* (2013.01)

(58) Field of Classification Search
CPC ... C09D 11/322; C09D 11/033; C09D 11/037; C09D 11/36; C09D 11/38; B41J 2/17596; C08K 3/346; C08K 2003/265
See application file for complete search history.

(56) References Cited

U.S. PATENT DOCUMENTS

2003/0041776 A1* 3/2003 Spencer ................. C09D 11/18 106/31.86
2005/0011404 A1* 1/2005 Patel ...................... C09D 11/18 106/31.27
(Continued)

FOREIGN PATENT DOCUMENTS

CN 102076791 A 5/2011
CN 107699039 A 2/2018
(Continued)

OTHER PUBLICATIONS

English machine translation of JP-2009270033-A (Year: 2009).*
(Continued)

*Primary Examiner* — Amber R Orlando
*Assistant Examiner* — Jeffrey Eugene Barzach
(74) *Attorney, Agent, or Firm* — XSENSUS LLP

(57) ABSTRACT

Provided is an ink including a solvent, a resin, and thickening particles. The ink has a viscosity of $3.00\times10^3$ mPa·s or more and $2.50\times10^4$ mPa·s or less at 25° C. at a shear rate of 1 $s^{-1}$, and a viscosity of 130 mPa·s or less at 25° C. at a shear rate of 5,000 $s^{-1}$.

16 Claims, 4 Drawing Sheets

(51) Int. Cl.

| | |
|---|---|
| ***C09D 11/033*** | (2014.01) |
| ***C09D 11/037*** | (2014.01) |
| ***C09D 11/36*** | (2014.01) |

(56) References Cited

U.S. PATENT DOCUMENTS

| | | | | |
|---|---|---|---|---|
| 2010/0186623 | A1 * | 7/2010 | Okabe | C09D 11/16 106/31.6 |
| 2014/0147190 | A1 * | 5/2014 | Takayama | B43K 1/084 401/216 |
| 2015/0071698 | A1 * | 3/2015 | Otsubo | B43K 7/01 401/209 |
| 2016/0002481 | A1 | 1/2016 | Oriakhi | |
| 2021/0108099 | A1 * | 4/2021 | Caffier | C08K 3/36 |
| 2023/0193062 | A1 * | 6/2023 | Omata | B41J 2/14 347/100 |

FOREIGN PATENT DOCUMENTS

| | | | | | |
|---|---|---|---|---|---|
| CN | 111417468 | A | | 7/2020 | |
| CN | 114918109 | A | | 8/2022 | |
| EP | 4050074 | A1 | * | 8/2022 | C09D 10/00 |
| EP | 4 112 311 | A1 | | 1/2023 | |
| JP | 2004-142382 | A | | 5/2004 | |
| JP | 2005-350570 | A | | 12/2005 | |
| JP | 2009270033 | A | * | 11/2009 | |
| JP | 4397484 | B2 | * | 1/2010 | |
| JP | 2017088840 | A | * | 5/2017 | |
| JP | 2018-030957 | A | | 3/2018 | |
| JP | 2020050725 | A | * | 4/2020 | |
| JP | 6992660 | B2 | * | 1/2022 | |

OTHER PUBLICATIONS

English machine translation of JP-2017088840-A (Year: 2017).*

Wagner, Norman J, and Jan Mewis. "Colloidal Suspension Rheology". Cambridge University Press, 2012. Chapter 2, p. 36-38. https://www.eng.uc.edu/~beaucag/Classes/Properties/Books/MewisandWagnerColloidalsuspensionrheology(2011).pdf (Year: 2012).*

English machine translation of JP-6992660-B2 (Year: 2022).*

English machine translation of JP-4397484-B2 (Year: 2010).*

English machine translation of JP-2020050725-A (Year: 2020).*

Extended European Search Report issued Jul. 4, 2024 in European Patent Application No. 24152708.4, 6 pages.

The First Office Action mailed Jan. 27, 2026, in Chinese Application No. 202410053990.9, 16 pages including English translation.

* cited by examiner

INK, PRINTING APPARATUS, PRINTING METHOD, AND PRINTED MATTER

CROSS-REFERENCE TO RELATED APPLICATIONS

This patent application is based on and claims priority pursuant to 35 U.S.C. § 119(a) to Japanese Patent Application No. 2023-007341, filed on Jan. 20, 2023, in the Japan Patent Office, the entire disclosure of which is hereby incorporated by reference herein.

BACKGROUND

Technical Field

The present disclosure relates to an ink, a printing apparatus, a printing method, and a printed matter.

Related Art

Conventionally, solvent-type coatings are generally used as coatings for road surfaces, floors, wall surfaces of buildings, and the like. Solvent-type inks have a short drying time, and thus, have the advantage of being less affected by climate conditions, so that the objects to which the solvent-type inks can be applied are not limited. However, solvent-type inks contain volatile organic compounds (VOC), which pose problems such as risks including health hazards and environmental pollution, odor, and flammability.

Due to these problems, in recent years, water-type coatings have started to replace solvent-type inks as coatings used for road surfaces, floors, wall surfaces of buildings, and the like. Compared to the solvent-type inks, water-type inks have almost no odor and a significantly lower content of VOCs, and thus, have less impact on humans and the environment.

SUMMARY

According to an embodiment of the present invention, an ink contains a solvent, a resin, and thickening particles, and has a viscosity of $3.00\times10^3$ mPa·s or more and $2.50\times10^4$ mPa·s or less at 25° C. at a shear rate of 1 $s^{-1}$, and a viscosity of 130 mPa·s or less at 25° C. at a shear rate of 5,000 $s^{-1}$.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
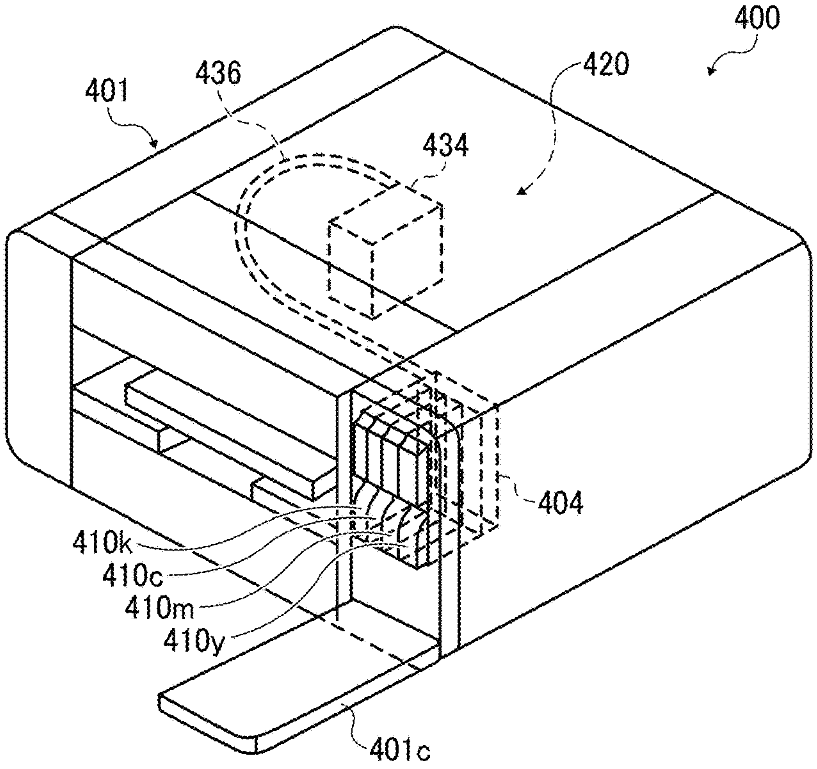
FIG. 1 is a schematic view of a printing apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

According to embodiments of the present invention, provided is an ink having excellent discharge stability and concealability of a base material when used for coating a road surface, a wall surface of a building such as an exterior wall and an interior wall, a wall surface of a civil engineering structure such as a bridge and a tunnel, and a porous base material.

(Ink)

According to an embodiment of the present invention, an ink contains a solvent, a resin, and thickening particles, and further contains other components if desired.

The ink of the present embodiment is preferably ink used for coating a road surface, an exterior wall, and a porous base material.

The ink of the present embodiment is ink exhibiting pseudoplastic flow. Therefore, after the ink is discharged onto asphalt of a road surface and the like, the viscosity of the ink increases, so that the ink hardly infiltrates into the road surface and a thick coating film may be formed to improve the concealability. Further, when ink is discharged from a nozzle by using an inkjet method, the viscosity of the ink decreases, and thus, the discharge stability improves.

The viscosity of the ink also increases after ink is discharged on a wall surface of a building such as an exterior wall or an interior wall, and on a wall surface of a civil engineering structure such as a bridge and a tunnel. Therefore, it is possible to prevent ink from dripping and a thick coating film may be formed on the wall surface to improve the concealability.

The above-mentioned pseudoplastic flow means that the viscosity at 25° C. at a shear rate of 1 $s^{-1}$ is $3.00\times10^3$ mPa·s or more and $2.50\times10^4$ mPa·s or less, and the viscosity at 25° C. at a shear rate of 5,000 $s^{-1}$ is 130 mPa·s or less.

The ink of the present embodiment is ink exhibiting pseudoplastic flow. Therefore, after the ink is discharged onto asphalt of a road surface or the like, the viscosity of the ink increases, so that the ink hardly infiltrates into the road surface and a thick coating film may be formed to improve the concealability. Further, when ink is discharged from a nozzle by using an inkjet method, the viscosity of the ink decreases, and thus, the discharge stability improves.

In the ink of the present embodiment, the viscosity at 25° C. at a shear rate of 1 $s^{-1}$ is $3.00\times10^3$ mPa·s or more and $2.50\times10^4$ mPa·s or less. The viscosity is preferably $6.00\times10^3$ mPa·s or more and $2.50\times10^4$ mPa·s or less, and more preferably $6.00\times10^3$ mPa·s or more and $1.40\times10^4$ mPa·s or less to obtain excellent concealability and prevent the scattering of ink during discharge.

The ink of the present embodiment has a viscosity of 130 mPa·s or less at 25° C. at a shear rate of 5,000 $s^{-1}$, and preferably has a viscosity of 30 mPa·s or more and 80 mPa·s or less to obtain excellent discharge stability.

The ink of the present embodiment preferably has a viscosity of $3.00\times10^4$ mPa·s or more at 25° C. at a shear rate of 0.1 $s^{-1}$. Thus, it is possible to obtain excellent concealability and prevent the scattering of ink during discharge.

A method of measuring the viscosity is not particularly limited and may be appropriately selected according to a purpose. For example, a cone plate (cone radius: 25 mm, cone angle: 1°) in an MCR 301 (manufactured by Anton Parr GmbH) may be used to measure the viscosity.

<Thickening Particles>

The "thickening property" of the above-mentioned thickening particles refers to a property by which, in a solution such as ink containing the particles, the viscosity increases when the shear rate is decreased by adding the particles into the solution, and the viscosity decreases when the shear rate is increased. When 60 g of the thickening particles are dispersed in 100 mL of water at 25° C., the viscosity at a shear rate of 0.1 $s^{-1}$ is 100 mPa·s or more and 900,000 mPa·s or less, and the viscosity at a shear rate of 5,000 $s^{-1}$ is 1 mPa·s or more and 200 mPa·s or less. Further, the viscosity increases when the shear rate is decreased, and the viscosity decreases when the shear rate is increased.

When the ink of the present embodiment contains the thickening particles, it is possible to control the viscosity of the ink. Specifically, by controlling the viscosity of the ink so that the viscosity at 25° C. at a shear rate of 1 $s^{-1}$ is $3.00\times10^3$ mPa or more and $2.50\times10^4$ mPa·s or less, a thick coating film of the ink can be formed and the concealability of the base material is excellent. Further, by controlling the viscosity of the ink so that the viscosity at 25° C. at a shear rate of 5,000 $s^{-1}$ is 130 mPa·s or less, the discharge stability of the ink can be improved.

The thickening particles are not particularly limited and can be appropriately selected according to a purpose. Examples of the thickening particles include, but are not limited to, fumed silica, precipitated silica, diatomaceous earth, bentonite, sepiolite, talc, calcium carbonate, barium sulfate, and polyethylene oxide. These thickening particles may be used alone or in combination of two or more types. Among these, calcium carbonate and talc are preferably used to obtain a robust ink coating film.

Moreover, a mixed crystal may be used as the thickening particles.

The thickening particles may be used in combination with a thickening agent that is not in the form of particles. Examples of the thickening agent that is not in the form of particles include, but are not limited to, resin-like thickening agents that fuse with the coating to exhibit an effect of the "thickening property".

The type of calcium carbonate is not particularly limited and may be appropriately selected according to a purpose. For example, commercially available products can be used. The commercially available products of calcium carbonate are not particularly limited and may be appropriately selected according to a purpose. Examples of the commercially available products of calcium carbonate include, but are not limited to, UP-G (manufactured by Imerys Specialties Japan Co., Ltd., solid content 100%), LUMINOUS (manufactured by Maruo Calcium Co., Ltd., solid content 100%) CALTEX 5 (manufactured by Maruo Calcium Co., Ltd., solid content 100%), SUPER #2000 (manufactured by Maruo Calcium Co., Ltd., solid content 100%), SUPER SSS (Maruo Calcium Co., Ltd., solid content 100%), SOFTON 1500 (Bihoku Funka Kogyo Co., Ltd., solid content 100%), SOFTON 3200 (Bihoku Funka Kogyo Co., Ltd., solid content 100%), BF100 (Bihoku Funka Kogyo Co., Ltd., solid content 100%), and LIGHTON A-5 (Bihoku Funka Kogyo Co., Ltd., solid content 100%).

The type of talc is not particularly limited and may be appropriately selected according to a purpose. For example, commercially available products can be used.

The commercially available products of talc are not particularly limited and may be appropriately selected according to a purpose. Examples of the commercially available products include, but are not limited to, NANO ACE D-600 (Nippon Talc Co., Ltd., solid content 100%).

The content of the thickening particles is not particularly limited and may be appropriately selected according to a purpose. However, the content is preferably 20.0 mass % or more and 55.0 mass % or less with respect to the total amount of the ink. Thus, it is easier to control the viscosity of the ink.

<Resin>

The resin is not particularly limited and can be appropriately selected according to a purpose. Examples of the resin include, but are not limited to, urethane resins, polyester resins, acrylic resins, vinyl acetate resins, styrene resins, butadiene resins, styrene-butadiene resins, vinyl chloride resins, styrene-acrylic resins, and silicone-acrylic resins. These resins may be used alone or in combination of two or more types.

Note that resin particles formed of these resins may be used as the resin, and the ink may be obtained by dispersing the resin particles in water as a dispersion medium to form a resin emulsion, and mixing the resin emulsion with materials such as coloring materials and organic solvents.

The resin particles may be appropriately synthesized, or a commercially available product may be used as the resin particles. These resin particles may be used alone or in combination of two or more types of resin particles.

The glass transition temperature of the resin is not particularly limited and can be appropriately selected according to a purpose. However, considering that a thick coating film may crack, the glass transition temperature is preferably 15° C. or less, and more preferably 0° C. or less.

A method of measuring the glass transition temperature is not particularly limited and can be appropriately selected according to a purpose. For example, in a resin emulsion, the glass transition temperature may be determined as follows.

Specifically, 4 g of the resin emulsion is filled into a petri dish made of a tetrafluoroethylene/perfluoroalkyl vinyl ether copolymer (PFA) having a diameter of 50 mm and the resin emulsion is spread evenly and dried at 50° C. for one week to obtain a resin film. 5.0 mg of the obtained resin film is filled into a sample container made of aluminum, and the sample container is placed on a holder unit and set in an electric furnace.

Next, in a nitrogen atmosphere, the temperature is raised from 0° C. to 150° C. at a temperature increase rate of 10° C./min, then lowered from 150° C. to −80° C. at a cooling rate of 5° C./min, and raised again to 150° C. at a temperature increase rate of 10° C./min, to obtain a DSC curve.

An analysis program of a DSC-60 system is used to analyze, from the obtained DSC curve, an inflection part during the second temperature increase by the midpoint method to determine the glass transition temperature (Tg).

The content of the resin is not particularly limited and may be appropriately selected according to a purpose. However, the content is preferably 5 mass % or more and 30 mass % or less to obtain a robust dried film.

Note that the content expresses the solid content of the resin.

The ratio (A/B) of a content (A) of the thickening particles to a solid content (B) of the resin is not particularly limited, and can be appropriately selected according to a purpose. However, the ratio is preferably 0.8 or more, more preferably 1.0 or more, and even more preferably 1.5 or more. If the ratio (A/B) is 0.8 or more, excellent discharge stability is obtained, and excellent concealability of the base material is achieved by forming a thick coating film.

<Solvent>

The solvent is not particularly limited and can be appropriately selected according to a purpose. Examples of the solvent include, but are not limited to, organic solvents and water.

The organic solvent is not particularly limited and can be appropriately selected according to a purpose. Examples of the organic solvent include, but are not limited to, ethers such as polyhydric alcohol alkyl ethers and polyhydric alcohol aryl ethers, polyhydric alcohols, heterocyclic compounds containing nitrogen, amides, amines, compounds containing sulfur, propylene carbonate, and ethylene carbonate.

The polyhydric alcohols are not particularly limited and can be appropriately selected according to a purpose. However, dihydric alcohols and trihydric alcohols may be used, because these polyhydric alcohols function as wetting agents and provide excellent discharge stability.

Examples of the dihydric alcohols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, and 1,5-hexanediol.

Examples of the trihydric alcohols include, but are not limited to, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

The polyhydric alcohol alkyl ethers are not particularly limited and can be appropriately selected according to a purpose. Examples of the polyhydric alcohol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

The polyhydric alcohol aryl ethers are not particularly limited and can be appropriately selected according to a purpose. Examples of the polyhydric alcohol aryl ethers include, but are not limited to, ethylene glycol monophenyl ether and ethylene glycol monobenzyl ether.

The heterocyclic compounds containing nitrogen are not particularly limited and can be appropriately selected according to a purpose. Examples of the heterocyclic compounds containing nitrogen include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

The amides are not particularly limited and can be appropriately selected according to a purpose. Examples of the amides include, but are not limited to, formamide, N-methylformamide, N,N-dimethylformamide, 3-methoxy-N,N-dimethylpropionamide, and 3-butoxy-N,N-dimethylpropionamide.

The amines are not particularly limited and can be appropriately selected according to a purpose. Examples of the amines include, but are not limited to, monoethanolamine, diethanolamine, and triethylamine.

The compounds containing sulfur are not particularly limited and can be appropriately selected according to a purpose. Examples of the compounds containing sulfur include, but are not limited to, dimethyl sulfoxide, sulfolane, and thiodiethanol.

The content of the organic solvent is not particularly limited and can be appropriately selected according to a purpose. However, the content is preferably 7.0 mass % or less, and more preferably 5.0 mass % or less, to obtain excellent drying properties.

The content of water is not particularly limited and can be appropriately selected according to a purpose. However, considering the drying properties and the discharge reliability of the ink, the content of water is preferably 10 mass % or more and 90 mass % or less, and more preferably 20 mass % or more and 60 mass % or less, with respect to the total amount of the ink.

<Other Components>

The other components are not particularly limited and can be appropriately selected according to a purpose. Examples of the other components include, but are not limited to, surfactants, coloring materials, antifoaming agents, preservatives and fungicides, rust inhibitors, pH adjusters, and film-forming auxiliary agents.

—Surfactant—

The surfactants are not particularly limited and can be appropriately selected according to a purpose. Examples of the surfactants include, but are not limited to, silicone-based surfactants, fluorine-based surfactants, amphoteric surfactants, nonionic surfactants, and anionic surfactants. These surfactants may be used alone or in combination of two or more types.

The silicone-based surfactants are preferably silicone-based surfactants that do not decompose even at high pH.

The silicone-based surfactants are not particularly limited and can be appropriately selected according to a purpose. Examples of the silicone-based surfactants include, but are not limited to, silicone-based surfactants having modified groups such as polyether-modified silicone-based surfactants, polydimethylsiloxane modified in a side chain, polydimethylsiloxane modified at both ends, polydimethylsiloxane modified at one end, and polydimethylsiloxane modified at both side chain ends. These silicone-based surfactants may be used alone or in combination of two or more types.

The modified group is not particularly limited and can be appropriately selected according to a purpose. However, silicone-based surfactants having a polyoxyethylene group or a polyoxyethylene polyoxypropylene group have excellent properties as aqueous surfactants and thus are preferably used.

The silicone-based surfactant may be appropriately synthesized, or a commercially available product may be used as the silicone-based surfactant.

The commercially available products are not particularly limited and can be appropriately selected according to a purpose. Examples of the commercially available products include, but are not limited to, products available from BYK-Chemie GmbH, Shin-Etsu Chemical Co., Ltd., Toray Dow Corning Silicone Co., Ltd., Nihon Emulsion Co., Ltd., and Kyoeisha Chemical.

The polyether-modified silicone-based surfactants are not particularly limited and can be appropriately selected according to a purpose. Examples thereof include, but are not limited to, a compound obtained by introducing a polyalkylene oxide structure into the side chain of the Si moiety of dimethylsiloxane.

The polyether-modified silicone-based surfactants are not particularly limited and can be appropriately selected according to a purpose. Examples thereof include, but are not limited to, a surfactant obtained by introducing a polyalkylene oxide structure expressed by General Formula (S-1) below into the side chain of the Si moiety of dimethylpolysiloxane.

General Formula (S-1)

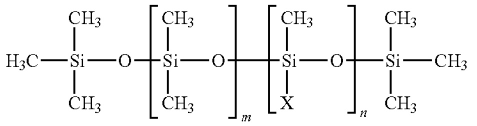

$X = —R(C_2H_4O)_a\ (C_3H_6O)_b R'$ (in General Formula (S-1), m, n, a, and b each independently represent an integer, R represents an alkylene group, and R' represents an alkyl group)

A commercially available product may be used as the polyether-modified silicone-based surfactant.

The commercially available product used as the polyether-modified silicone-based surfactant is not particularly limited and may be appropriately selected according to a purpose. Examples thereof include, but are not limited to, KF-618, KF-642, and KF-643 (manufactured by Shin-Etsu Chemical Co., Ltd.), EMALEX-SS-5602 and SS-1906EX (manufactured by Nihon Emulsion Co., Ltd.), FZ-2105, FZ-2118, FZ-2154, FZ-2161, FZ-2162, FZ-2163, and FZ-2164 (manufactured by Dow Corning Toray Silicone Co., Ltd.), BYK-33 and BYK-387 (manufactured by BYK-Chemie GmbH), and TSF4440, TSF4452, and TSF4453 (manufactured by Toshiba Silicones).

The fluorine-based surfactants are not particularly limited and can be appropriately selected according to a purpose. However, from the viewpoint of low foamability, it is preferable to use perfluoroalkyl sulfonic acid compounds, perfluoroalkyl carboxylic acid compounds, perfluoroalkyl phosphate ester compounds, perfluoroalkyl ethylene oxide adducts, and polyoxyalkylene ether polymer compounds having a perfluoroalkyl ether group in a side chain. These fluorine-based surfactants may be used alone or in combination of two or more types.

The perfluoroalkyl sulfonic acid compounds are not particularly limited and can be appropriately selected according to a purpose. Examples thereof include, but are not limited to, perfluoroalkyl sulfonic acid and perfluoroalkylsulfonic acid salts.

The perfluoroalkyl carboxylic acid compounds are not particularly limited and can be appropriately selected according to a purpose. Examples thereof include, but are not limited to, perfluoroalkyl carboxylic acid and perfluoroalkyl carboxylic acid salts.

The polyoxyalkylene ether polymer compounds having a perfluoroalkyl ether group in a side chain are not particularly limited and can be appropriately selected according to a purpose. Examples thereof include, but are not limited to, sulfate ester salts of polyoxyalkylene ether polymers having a perfluoroalkyl ether group in a side chain, and salts of polyoxyalkylene ether polymers having a perfluoroalkyl ether group in a side chain.

Counter ions of the salts in the fluorine-based surfactants are not particularly limited and can be appropriately selected according to a purpose. Examples thereof include, but are not limited to, Li, Na, K, $NH_4$, $NH_3CH_2CH_2OH$, $NH_2(CH_2CH_2OH)_2$, and $NH(CH_2CH_2OH)_3$.

The fluorine-based surfactants are not particularly limited and can be appropriately selected according to a purpose. However, the fluorine-based surfactant is preferably a compound having 2 to 16 fluorine-substituted carbon atoms, and more preferably a compound having 4 to 16 fluorine-substituted carbon atoms.

Examples of the fluorine-based surfactants include, but are not limited to, perfluoroalkyl phosphate ester compounds, perfluoroalkyl ethylene oxide adducts, and polyoxyalkylene ether polymer compounds having a perfluoroalkyl ether group in a side chain. Among these fluorine-based surfactants, the polyoxyalkylene ether polymer compounds having a perfluoroalkyl ether group in a side chain have low foamability and thus are preferred, and in particular, fluorine-based surfactants expressed by General Formula (F-1) and General Formula (F-2) are preferred.

General Formula (F-1)

$$CF_3CF_2(CF_2CF_2)_m—CH_2CH_2O(CH_2CH_2O)_nH$$

(in the compound expressed by General Formula (F-1) above, to impart water solubility, m is preferably an integer from 0 to 10 and n is preferably an integer from 0 to 40)

General Formula (F-2)

$$C_mF_{2m+1}—CH_2CH(OH)CH_2—O—(CH_2CH_2O)_n—Y$$

(in the compound expressed by General Formula (F-2) above, Y represents H, or $C_mF_{2m+1}$ (where m represents an integer from 1 to 6), or $CH_2CH(OH)CH_2—C_mF_{2m+1}$ (where m represents an integer from 4 to 6), or $C_pH_{2p+1}$ (where p represents an integer from 1 to 19); n represents an integer from 1 to 6; and a represents an integer from 4 to 14)

A commercially available product may be used as the fluorine-based surfactant.

The commercially available product is not particularly limited and can be appropriately selected according to a purpose. Examples of the commercially available product include, but are not limited to, SURFLON S-111, S-112, S-113, S-121, S-131, S-132, S-141, and S-145 (all manufactured by Asahi Glass Co., Ltd.); FULLARD FC-93, FC-95, FC-98, FC-129, FC-135, FC-170C, FC-430, and FC-431 (all manufactured by Sumitomo 3M Co., Ltd.); MEGAFACE F-470, F-1405, and F-474 (all manufactured by Dainippon Ink and Chemicals Co., Ltd.); ZONYL TBS, FSP, FSA, FSN-100, FSN, FSO-100, FSO, FS-300, UR, CAPSTONE FS-30, FS-31, FS-3100, FS-34, and FS-35 (all manufactured by Chemours Co., Ltd.); FT-110, FT-250, FT-251, FT-400S, FT-150, and FT-400SW (all manufactured by Neos Co., Ltd.), POLYFOX PF-136A, PF-156A, PF-151N, PF-154, and PF-159 (manufactured by Omnova Co., Ltd.), and UNIDYNE DSN-403N (manufactured by Daikin Industries, Ltd.). Among these, FS-3100, FS-34, and FS-300 manufactured by Chemours Co., Ltd., FT-110, FT-250, FT-251, FT-400S, FT-150, and FT-400SW manufactured by Neos Co., Ltd., POLYFOX PF-151N manufactured by Omnova Co., Ltd., and UNIDYNE DSN-403N manufactured by Daikin Industries, Ltd. provide excellent printing quality, and in particular, remarkably improve the color development, the permeability of paper, the wettability, and uniform dyeing properties, and thus are particularly preferred.

The amphoteric surfactants are not particularly limited and can be appropriately selected according to a purpose. Examples of the amphoteric surfactants include, but are not limited to, lauryl aminopropionate, lauryl dimethyl betaine, stearyl dimethyl betaine, and lauryl dihydroxyethyl betaine. These amphoteric surfactants may be used alone or in combination of two or more types.

The nonionic surfactants are not particularly limited and can be appropriately selected according to a purpose. Examples of the nonionic surfactants include, but are not limited to, polyoxyethylene alkylphenyl ether, polyoxyethylene alkyl ester, polyoxyethylene alkyl amine, polyoxyethylene alkyl amide, polyoxyethylene-propylene block polymer, sorbitan fatty acid ester, polyoxyethylene sorbitan fatty acid ester, and ethylene oxide adducts of acetylene alcohol. These nonionic surfactants may be used alone or in combination of two or more types.

The anionic surfactants are not particularly limited and can be appropriately selected according to a purpose. Examples of the anionic surfactants include, but are not limited to, polyoxyethylene alkyl ether acetate, dodecylbenzene sulfonate, laurate, and salts of polyoxyethylene alkyl ether sulfate. These anionic surfactants may be used alone or in combination of two or more types.

The content of the surfactant is not particularly limited and can be appropriately selected according to a purpose. However, to achieve excellent wettability and discharge stability and improve the image quality, the content of the surfactant is preferably 0.001 mass % or more and 5 mass % or less, and more preferably, 0.05 mass % or more and 5 mass % or less.

—Coloring Material—

The coloring material is not particularly limited, can be appropriately selected according to a purpose, and examples thereof include pigments and dyes. Examples of the pigments include, but are not limited to, inorganic pigments and organic pigments. These pigments may be used alone or in combination of two or more types. Moreover, a mixed crystal may be used as the pigment.

The pigments are not particularly limited and can be appropriately selected according to a purpose. Examples of the pigments include, but are not limited to, black pigments, yellow pigments, magenta pigments, cyan pigments, white pigments, green pigments, orange pigments, glossy color pigments such as gold pigments and silver pigments, and metallic pigments.

The inorganic pigments are not particularly limited and can be appropriately selected according to a purpose. Examples of the inorganic pigments include, but are not limited to, titanium oxide, iron oxide, aluminum hydroxide, Barium Yellow, Cadmium Red, Chrome Yellow, and carbon black produced by a known method such as a contact method, a furnace method, and a thermal method.

The organic pigments are not particularly limited and can be appropriately selected according to a purpose. Examples of the organic pigments include, but are not limited to, azo pigments, polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye chelates and acid dye chelates), nitro pigments, nitroso pigments, aniline black, hollow resin particles, and hollow inorganic particles. Among these, organic pigments having good affinity for solvents are preferred.

Specific examples of the organic pigments include, but are not limited to, carbon blacks (C.I. Pigment Black 7) such as furnace black, lamp black, acetylene black, and channel black used for black colors, or metals such as copper, iron (C.I. Pigment Black 11), and titanium oxide, and organic pigments such as aniline black (C.I. Pigment Black 1). Examples of organic pigments used for colors include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213, C.I. Pigment Orange 5, 13, 16, 17, 36, 43, and 51, C.I. Pigment Red 1, 2, 3, 5, 17, 22, 23, 31, 38, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Bengara), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264, C.I. Pigment Violet 1 (Rhodamine Lake), 3, 5:1, 16, 19, 23, and 38, C.I. Pigment Blue 1, 2, 15 (Phthalocyanine Blue), 15:1, 15:2, 15:3, 15:4 (Phthalocyanine Blue), 16, 17:1, 56, 60, and 63, and C.I. Pigment Green 1, 4, 7, 8, 10, 17, 18, and 36.

The pigment is preferably used after being dispersed in the ink.

Examples of methods of dispersing the pigment to obtain ink include, but are not limited to, a method of introducing a hydrophilic functional group into a pigment to obtain a self-dispersing pigment, a method of coating the surface of a pigment with a resin to disperse the pigment, and a method of using a dispersant to disperse the pigment.

Examples of the method of introducing a hydrophilic functional group into a pigment to obtain a self-dispersing pigment include, but are not limited to, a method of adding a functional group such as a sulfone group or a carboxyl group to a pigment (for example, carbon) to obtain a pigment that is dispersible in water.

Examples of the method of coating the surface of a pigment with a resin to disperse the pigment include, but are not limited to, a method of encapsulating the pigment in microcapsules to obtain a pigment that is dispersible in water. Such a pigment may be referred to as a resin-coated pigment. In this case, not all the pigment particles may be covered with the resin. The ink may contain pigment particles that are not covered with resin and pigment particles that are partially covered with resin.

Examples of the method of using a dispersant to disperse the pigment include, but are not limited to, a method of dispersing the pigment by using a known low-molecular-type dispersant or polymer-type dispersant, such as a surfactant. For example, depending on the pigment, anionic surfactants, cationic surfactants, amphoteric surfactants, and nonionic surfactants may be used as the dispersant. RT-100

(a nonionic surfactant) manufactured by Takemoto Oil & Fat Co., Ltd. and sodium naphthalene sulfonate formalin condensate can also be suitably used as the dispersant. One type of dispersant may be used alone, or two or more types may be used in combination.

The dyes are not particularly limited and can be appropriately selected according to a purpose. Examples of the dyes include, but are not limited to, acid dyes, direct dyes, reactive dyes, and basic dyes. These dyes may be used alone or in combination of two or more types.

Examples of the dyes include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The content of the coloring material is not particularly limited and can be appropriately selected according to a purpose. However, but the content is preferably 1.0 mass % or more and 15.0 mass % or less, and more preferably 1.0 mass % or more and 10.0 mass % or less with respect to the total amount of ink.

The P99 in the ISO Max Distance particle size distribution in the ink based on the number of particles in a range of 0.1 μm or more and 100 μm or less is not particularly limited and can be appropriately selected according to a purpose, but is preferably 9 μm or less. Thus, it is easier to control the viscosity of the ink at 25° C. at a shear rate of 5,000 $s^{-1}$.

Further, at a P99 of 9 μm or less, when a flow path from where ink is supplied to where the ink is discharged from a nozzle in a printing apparatus has a width of several tens of micrometers to several hundred micrometers, the flow of the ink in the flow path is smooth and the discharge stability can be improved.

A method of measuring the P99 in the ISO Max Distance particle size distribution is not particularly limited and can be appropriately selected according to a purpose. Examples of the method include, but are not limited to, a method of using an injection-type image analysis particle size distribution meter IF-3200 to measure the P99.

Specifically, the ink is diluted with water so that the particles in the ink can be observed, and the injection-type image analysis particle size distribution meter IF-3200 may be used to measure the P99 in the ISO Max Distance particle size distribution based on the number of particles in the ink in the range from 0.1 μm to 100 μm. The amount of dilution varies depending on the amount and the size of the particle components in the ink, and thus, it is desirable to adjust the dilution ratio so that the size of each particle in the ink can be observed. If the ink aggregates in water, the ink may be diluted with a solvent that does not cause the ink to aggregate (for example, cyclohexane).

The glass transition temperature of a dried film (may be referred to as "coating film" hereinafter) of the ink is not particularly limited and can be appropriately selected according to a purpose, but is preferably 15° C. or lower.

A method of measuring the glass transition temperature is not particularly limited and can be appropriately selected according to a purpose. However, the glass transition temperature may be measured by using a differential scanning calorimeter (TA-60WS and DSC-60, manufactured by Shimadzu Corporation).

Specifically, first, 4 g of the ink is filled into a petri dish made of a tetrafluoroethylene/perfluoroalkyl vinyl ether copolymer (PFA) having a diameter of 50 mm and the ink is spread evenly and dried at 50° C. for one week to obtain a dried film of the ink. 5.0 mg of the obtained dried film of the ink is filled into a sample container made of aluminum, and the sample container is placed on a holder unit and set in an electric furnace.

Next, in a nitrogen atmosphere, the temperature is raised from 0° C. to 150° C. at a temperature increase rate of 10° C./min, then lowered from 150° C. to −80° C. at a cooling rate of 5° C./min, and raised again to 150° C. at a temperature increase rate of 10° C./min, to obtain a DSC curve.

An analysis program of a DSC-60 system is used to analyze, from the obtained DSC curve, an inflection part during the second temperature increase by the midpoint method to determine the glass transition temperature (Tg).

The content of the resin in the dried film of the ink is not particularly limited and may be appropriately selected according to a purpose. However, the content is preferably 10 mass % or more and 60 mass % or less.

Note that the content expresses the solid content of the resin.

The solid content in the ink is not particularly limited and can be appropriately selected according to a purpose. However, to obtain good drying properties and excellent concealability, the solid content is preferably 45 mass % or more, and more preferably 55 mass % or more.

The solid content includes solid components contained in the ink. Examples of the solid components include, but are not limited to, the thickening particles, the resin, and the pigment.

The static surface tension of the ink is not particularly limited and can be appropriately selected according to a purpose. However, the static surface tension of the ink at 25° C. is preferably 35 mN/m or less, and more preferably 30 mN/m or less, so that the ink is suitably levelized on a base material and the drying time of the ink is shortened.

The pH of the ink is not particularly limited and can be selected appropriately according to a purpose. However, to prevent corrosion of metal members in contact with the ink, the pH of the ink is preferably 7 or more and 12 or less, and more preferably 8 or more and 11 or less.

<Method of Manufacturing Ink>

A method of manufacturing the ink is not particularly limited and can be appropriately selected according to a purpose. For example, the ink may be obtained by dispersing or dissolving the constituent components in an aqueous medium and further stirring and mixing as desired.

In the stirring and mixing, a stirrer using normal stirring blades, a magnetic stirrer, or a high-speed disperser may be used.

(Printing Method and Printing Apparatus)

The ink of the present embodiment can be used in various types of recording devices using an inkjet recording method, such as a printer, a facsimile machine, a copying machine, a multifunction peripheral including a printer/fax/copier, and a stereoscopic molding device.

In the present embodiment, the printing apparatus and the printing method respectively refer to an apparatus that discharges ink or various types of treatment liquids onto a printing material and a method of printing by using the apparatus.

The printing apparatus may further include, in addition to a head portion that discharges ink, units relating to feeding, conveying, and discharging of a printing material and further, devices referred to as a pretreatment device or a post-treatment device.

The printing apparatus and the printing method may include a heating unit used in a heating step and a drying unit used in a drying step. The heating unit and the drying unit include, for example, unit used for heating and drying a printed surface and a rear surface of a printing material. The heating unit and the drying unit are not particularly limited. For example, a hot air heater and an infrared heater may be used as the heating unit and the drying unit. The heating and the drying may be performed before, during, or after the printing.

The printing apparatus and the printing method are not limited to an apparatus and a method by which meaningful images such as characters and figures are visualized by using ink. For example, the printing apparatus and the printing method may form a pattern such as a geometric pattern, and may shape a three-dimensional image.

Further, unless otherwise specified, the printing apparatus includes both a serial-type apparatus in which a discharge head is moved and a line-type apparatus in which the discharge head is not moved.

The printing apparatus includes not only a desktop-type apparatus, but also a printing apparatus having a large width that can print on a recording medium having A0 size, and a book sheet printer in which a continuous sheet wound into a roll can be used as a recording medium, for example.

In one aspect, similarly to the case in which ink includes black (K), cyan (C), magenta (M), and yellow (Y) ink, the pretreatment device and the post-treatment device include a liquid storage portion and a liquid discharge head containing a pre-treatment liquid and a post-treatment liquid, and the pre-treatment liquid and the post-treatment liquid are discharged by an inkjet recording method.

In another aspect of the pretreatment device and the post-treatment device, the pretreatment device and the post-treatment device use a blade coating method, a roll coating method, or a spray coating method other than the inkjet recording method.

<Storage Container>

The storage container is a container storing the ink of the present embodiment, and further includes other members if desired.

The material of the container is not particularly limited, can be appropriately selected according to a purpose, and examples of the material include, but are not limited to, polyethylene terephthalate.

The shape, the structure, and the size of the container are not particularly limited and can be appropriately selected according to a purpose.

Figure 2:
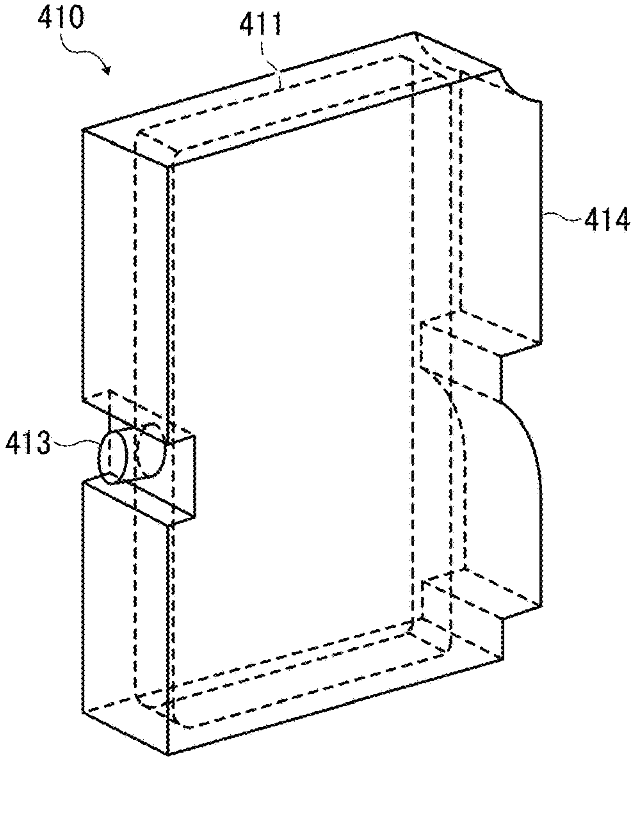
FIG. 2 is a perspective explanatory view of a main tank in the printing apparatus illustrated in FIG. 1.

An example of a printing apparatus will be described with reference to FIGS. 1 and 2. FIG. 1 is a perspective explanatory view of a printing apparatus. FIG. 2 is a perspective explanatory view of a main tank in the printing apparatus. One example of the printing apparatus is an image forming apparatus 400, which is a serial-type image forming apparatus. A mechanical portion 420 is provided in an external casing 401 of the image forming apparatus 400. Ink storage portions 411 of a main tank 410 (410*k*, 410*c*, 410*m*, and 410*y*) for each color of black (K), cyan (C), magenta (M), and yellow (Y) are each formed of a packaging member such as a laminated aluminum film. The ink storage portion 411 is housed in a storage container case 414 made of plastic, for example. Thus, the main tank 410 is used as an ink cartridge for each color.

A cartridge holder 404 is provided on a back side of an opening when a cover 401*c* of an apparatus main body is opened. The main tank 410 is detachably attached to the cartridge holder 404. Therefore, each ink discharge port 413 of the main tank 410 and a discharge head 434 for each color communicate with each other via a supply tube 436 for each color, and ink can be discharged from the discharge head 434 onto a recording medium.

In the present specification, the term "inkjet printing apparatus" refers to a liquid discharge apparatus that discharges the ink of the present embodiment, the treatment liquid, and the like onto the printing material.

An example of a liquid discharge apparatus as the inkjet printing apparatus will be described below with reference to the drawings. Note that the present embodiment is not limited to the embodiments described below.

Figure 3:
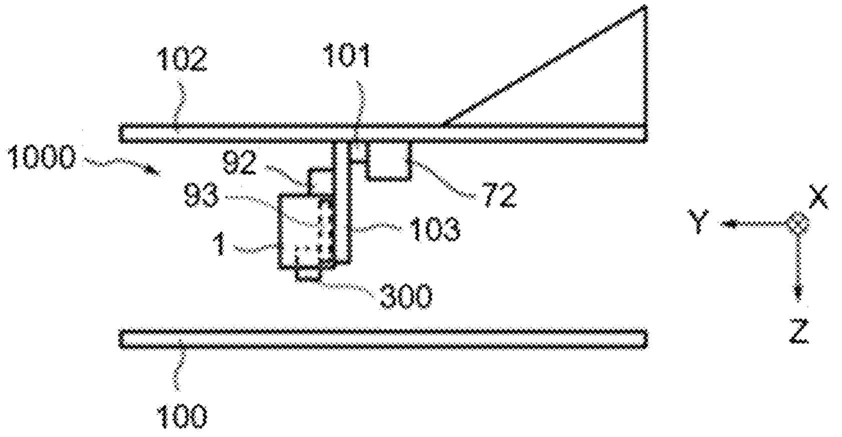
FIG. 3 is a schematic side view of a liquid discharge apparatus as a printing apparatus according to an embodiment of the present invention.
Figure 4:
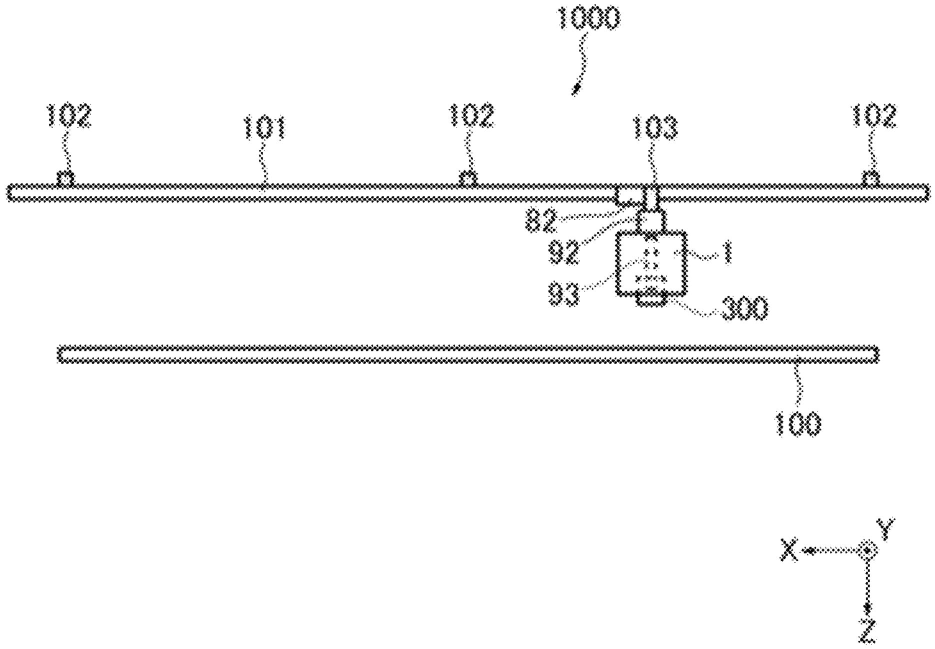
FIG. 4 is a schematic plan view of the liquid discharge apparatus illustrated in FIG. 4.

FIG. 3 is a view of the liquid discharge apparatus, seen from the side. FIG. 4 is a view of the liquid discharge apparatus, seen from the front.

A liquid discharge apparatus 1000 is installed to face a printing material 100. A carriage 1 includes a head 300 that discharges ink, which is an example of the liquid, toward the printing material 100. A Z-axis rail 103 holds the carriage 1 so that the carriage 1 can move in a Z-axis direction.

An X-axis rail 101 holds the Z-axis rail 103 so that the Z-axis rail 103 holding the carriage 1 can move in an X-axis direction. A Y-axis rail 102 holds the X-axis rail 101 so that the X-axis rail 101 can move in a Y-axis direction. Here, the X-axis is an example of a "first axis", the Y-axis is an example of a "second axis intersecting the first axis", and the Z-axis is an example of a "third axis intersecting the first axis and the second axis". Further, the carriage 1 is an example of a "liquid discharge unit", and the head 300 is an example of a "liquid discharge head".

The liquid discharge apparatus 1000 includes a Z-direction drive portion 92 that moves the carriage 1 in the Z-axis direction along the Z-axis rail 103, and an X-direction drive portion 72 that moves the Z-axis rail 103 in the X-axis direction along the X-axis rail 101. Further, the liquid discharge apparatus 1000 includes a Y-direction drive portion 82 that moves the X-axis rail 101 in the Y-axis direction along the Y-axis rail 102. The Z-direction drive portion 92 is an example of a "first drive unit" and moves the carriage 1 in the direction of the Z-axis, which intersects the X-axis and the Y-axis. Note that the movement of the carriage 1 and the head 300 in the direction of the Z-axis does not have to be parallel to the Z-axis direction, and may be an oblique movement, as long as the movement includes at least a component in the Z-axis direction.

The carriage 1 further includes another Z-direction drive portion 93. The Z-direction drive portion 93 is an example of a "second drive unit" and moves the head 300 relative to the carriage 1 in the direction of the Z-axis.

The liquid discharge apparatus 1000 configured as described above discharges ink from the head 300 toward the printing material 100, while moving the carriage 1 in the directions of the X-axis, the Y-axis, and the Z-axis, to perform drawing on the drawing material 100. Note that the printing material 100 is illustrated in the form of a flat plate. However, the printing material 100 may be a surface having a large curvature radius or an almost vertical surface such as a car, a truck, and an airplane.

—Ink Discharge Unit—

Figure 5:
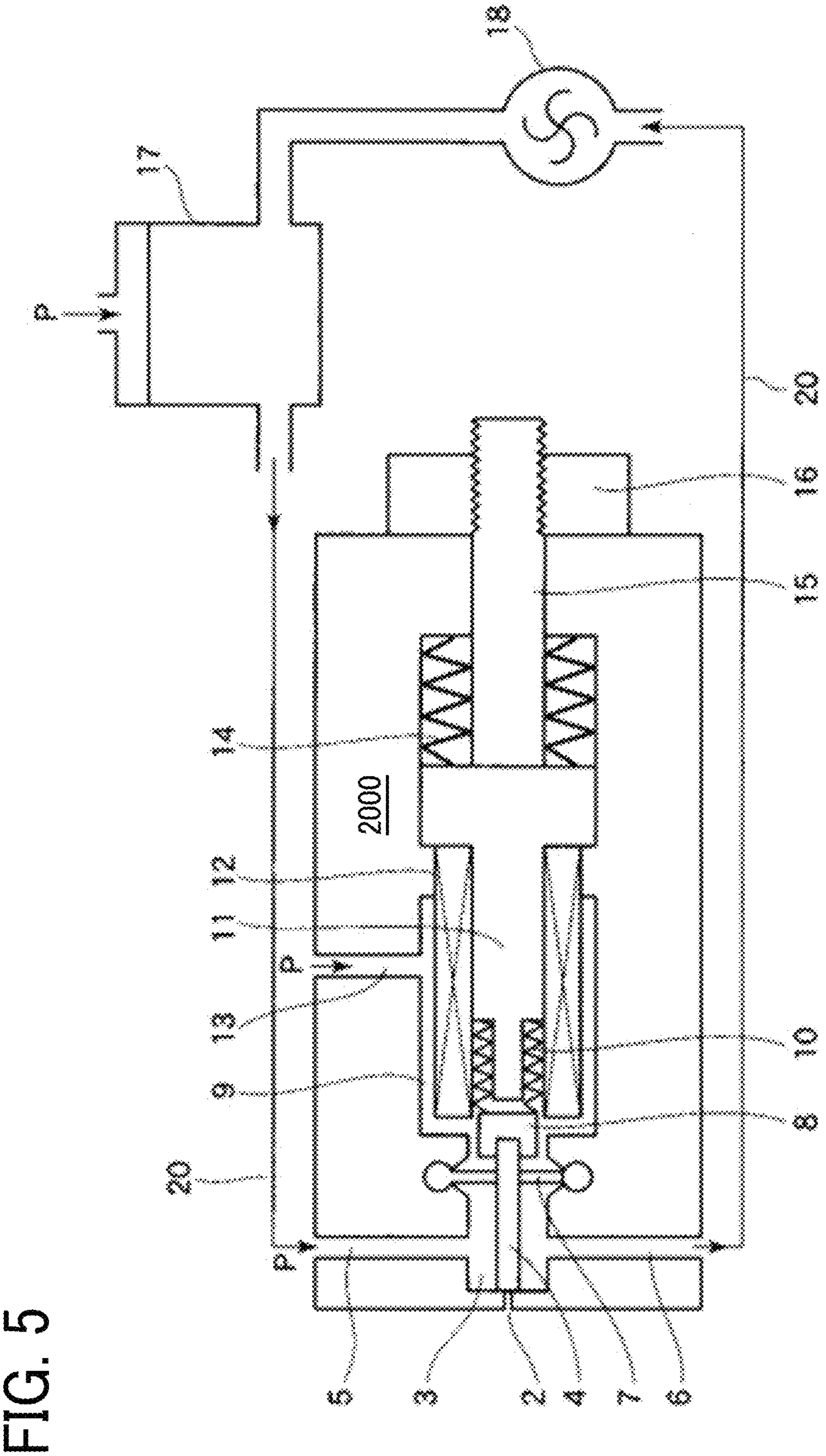
FIG. 5 is a schematic configuration diagram illustrating an inkjet nozzle as a discharge unit according to an embodiment of the present invention, in a state when the nozzle is closed.
Figure 6:
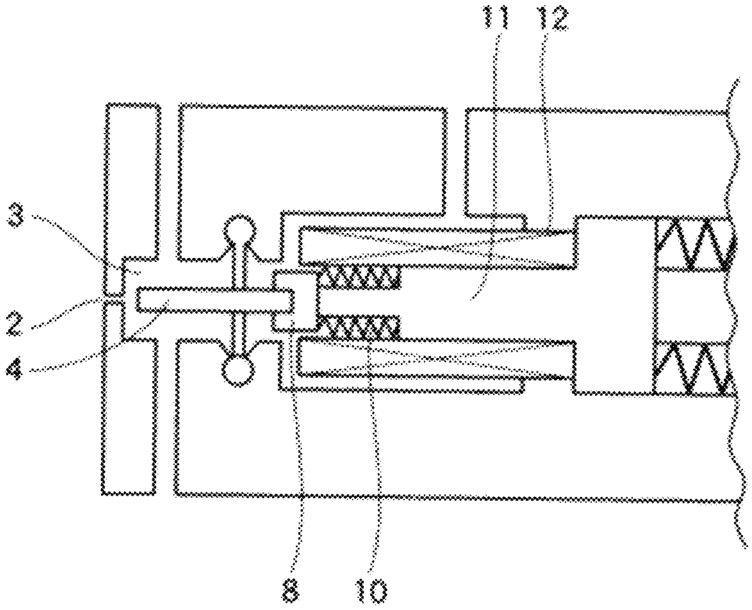
FIG. 6 is a schematic configuration diagram illustrating an inkjet nozzle as a discharge unit according to an embodiment of the present invention, in a state when the nozzle is opened.

The ink discharge unit of the present embodiment is not particularly limited, and examples thereof include an inkjet nozzle. Examples of the ink discharge unit includes a discharge unit illustrated in FIGS. 5 and 6 including a nozzle hole 2 through which ink is discharged, an ink chamber 3 that supplies pressurized ink to the nozzle hole 2, and a needle valve 4 that is provided in the ink chamber 3 and opens and closes the nozzle hole 2 to control the discharge of ink. In FIGS. 5 and 6, a numeral 2000 denotes an inkjet nozzle (serving as a discharge unit), a numeral 5 denotes an ink input path, a numeral 6 denotes an ink output path, a numeral 7 denotes an elastic diaphragm, a numeral 8 denotes a movable iron core, a numeral 9 denotes a drive mechanism housing space, a numeral 10 denotes a spring, a numeral 11 denotes a fixed iron core, a numeral 12 denotes a solenoid, a numeral 13 denotes a pressurized path, a numeral 14 denotes a spring for preventing screw looseness, a numeral 15 denotes a gap adjustment bolt, a numeral 16 denotes a nut, a numeral 17 denotes an ink tank, a numeral 18 denotes a pump, a numeral 20 denotes a circulation path, and a symbol P denotes a pressure.

An example of an inkjet nozzle for implementing the discharge unit is the inkjet nozzle described in Japanese Patent No. 4123897, and examples of the inkjet nozzle include inkjet nozzles illustrated in FIGS. 5 and 6.

—Printed Matter—

The printed matter of the present embodiment includes a printing material and a print layer formed on the printing material by the printing apparatus of the present embodiment.

Further, in the present embodiment, the terms "image formation", "recording", "text printing", "printing", and the like are all used synonymously.

The terms "recording medium", "media", and "printing material" are all used synonymously.

<Base Material>

The above-mentioned base material (may be referred to as "printing material" hereinafter) refers to an object to be printed by using the ink of the present embodiment, and refers to an object to which ink or a treatment liquid can attach even temporarily.

The base material is not particularly limited and can be appropriately selected according to a purpose. However, the base material is preferably a road surface, an exterior wall, and a porous base material.

The shape, the structure, and the material of the base material are not particularly limited and can be appropriately selected according to a purpose. Examples of the base material include, but are not limited to, sidings (ceramic, resin, wood, and metal sidings), asphalt, asphalt felt, concrete, glass, cloth, paper, plastic, wood, metal (such as brass, iron, aluminum, stainless steel (SUS), and copper), or a non-metallic base material coated with metal by a method such as vapor deposition.

Examples of the porous base material include, but are not limited to, base materials having high ink permeability, such as asphalt and sponge.

<Print Layer>

The print layer contains a resin and thickening particles, and may contain other components if desired.

The resin is not particularly limited and can be appropriately selected according to a purpose. Examples of the resin include, but are not limited to, a resin similar to the resin used in the ink.

The content of the resin is not particularly limited and can be appropriately selected according to a purpose. However, the content is preferably 10 mass % or more and 60 mass % or less.

Note that the content expresses the solid content of the resin.

The thickening particles are not particularly limited and can be appropriately selected according to a purpose. Examples of the thickening particles include, but are not limited to, thickening particles similar to the thickening particles used in the ink.

The content of the thickening particles is not particularly limited and can be appropriately selected according to a purpose. However, the content is preferably 3 mass % or more and 60 mass % or less.

The other components are not particularly limited and can be appropriately selected according to a purpose. Examples of the other components include, but are not limited to, components similar to the other components used in the ink.

EXAMPLES

Examples of the present embodiment will be described below, but the present embodiment is not limited to the Examples in any way.

Preparation Example 1 of Pigment Dispersion 200 parts by mass of C.I. Pigment White 6 (manufactured by Tayca Corp., product name "JR-403", number average primary particle diameter 250 nm, aspect ratio 2, surface treatment: Al, Si) as a pigment, 56 parts by mass of pigment dispersant (product name: TEGO Dispers 651, manufactured by Evonik Co., Ltd.), and 744 parts by mass of distilled water were premixed.

Afterwards, a bead mill disperser (manufactured by Kotobuki Kogyou Co., Ltd., UAM-015) was used to disperse the mixture during 15 minutes with zirconia beads (density $6.03\times10^{-6}$ g/m$^2$) having a diameter of 0.03 mm at a peripheral speed of 10 m/s, and a liquid temperature of 30° C. Next, The coarse particles were centrifuged and separated by using a centrifuge (manufactured by Kubota Corporation Co., Ltd., Model-3600) to obtain a white pigment dispersion (solid content 20.0 mass %) having an average particle diameter of 250 nm.

Preparation Example 2 of Pigment Dispersion

An automatic polymerization reactor (manufactured by Todoroki Sangyo Co., Ltd.: polymerization tester DSL-2AS type) was provided with a reaction vessel equipped with a stirring device, a liquid dropping device, a temperature sensor, and a reflux device including a nitrogen introduction device in a top part. 550 g of methyl ethyl ketone was added to the reaction vessel, and the interior of the reaction vessel was purged with nitrogen while stirring. Subsequently, the interior of the reaction vessel was heated to 80° C. while maintaining a nitrogen atmosphere. Next, the liquid dropping device was used to add dropwise over 4 hours a mixed solution of 75.0 g of 2-hydroxyethyl methacrylate, 77.0 g of methacrylic acid, 80.0 g of styrene, 150 g of butyl methacrylate, 98.0 g of butyl acrylate, 20.0 g of methyl methacrylate, and 40.0 g of "PERBUTYL (registered trademark) O" (manufactured by NOF Corporation).

After the dropwise addition, the reaction was continued for 15 hours at the same temperature to obtain a methyl ethyl ketone solution of a styrene-acrylic copolymer containing an anionic group and having an acid value of 100, a weight average molecular weight of 21,000, and a Tg (calculated value) of 31° C. After the reaction was completed, a part of the methyl ethyl ketone was removed by distillation under reduced pressure to obtain a copolymer solution in which the content of non-volatile components is adjusted to 50%.

1,000 g of copper phthalocyanine (SEIKALIGHT BLUE A612, manufactured by Dainichiseika Color & Chemicals Mfg. Co., Ltd.), 800 g of the copolymer solution, 143 g of a 10% aqueous sodium hydroxide solution, 100 g of methyl ethyl ketone, and 1,957 g of water were added to a mixing tank equipped with a cooling jacket and the mixture was stirred and mixed to obtain a mixed solution.

The obtained mixed solution was passed through a dispersion device (manufactured by Mitsui Mining Co., Ltd.: SC Mill SC100) filled with zirconia beads having a diameter of 0.3 mm, and the mixed solution was dispersed by a circulation method (a method in which the dispersion liquid discharged from the dispersion device is returned to the mixing tank), under conditions including a revolution speed of 2,700 revolutions/minute, a temperature of 40° C. or less (a constant temperature was maintained by passing cold water through the cooling jacket), and a duration of six hours.

After the mixed solution was completely dispersed, the original dispersion liquid was extracted from the mixing tank, and then, the mixing tank and the flow path of the dispersion device were washed with 10,000 g of water, and the mixture was combined with the original dispersion liquid to obtain a diluted dispersion liquid.

The obtained diluted dispersion liquid was filled into a distillation apparatus made of glass, and the entire amount of methyl ethyl ketone and a part of the water were removed by distillation. After cooling the mixture to room temperature, 10% hydrochloric acid was added dropwise while stirring to adjust the pH to 4.5. Subsequently, the solid content was filtered by using a Nutsche filtration device (manufactured by Japan Chemical Engineering & Machinery Co., Ltd., pressure filtration device) and washed with water. The cake was placed in a container, 200 g of a 20% aqueous potassium hydroxide solution was added thereto, and then, the obtained mixture was dispersed by using a disperser (TK HOMO DISPER, manufactured by Tokushu Kika Kogyo Co., Ltd.), and water was further added to adjust the non-volatile content. Thereby, a cyan pigment dispersion (pigment content concentration: 20.0 mass %) was obtained that included composite particles (pigment-containing material) in which copper phthalocyanine was coated with a styrene-acrylic copolymer containing a carboxyl group neutralized in potassium hydroxide.

Preparation Example 1 of Resin Emulsion

A mixed solution of 55.4 parts by mass of methyl methacrylate as a monomer, 44.6 parts by mass of 2-ethylhexyl acrylate, 1.5 parts by mass of AQUALON KH-20 (manufactured by DKS Co., Ltd.) as an emulsifier, and 53.1 parts by mass of ion-exchanged water was emulsified by using a batch-type homomixer to prepare a monomer pre-emulsion.

89.4 parts by mass of ion-exchanged water were filled into a four-necked flask having a volume of 2 L and being equipped with a stirrer, a nitrogen introduction tube, a reflux condenser, a thermometer, and a raw material inlet. The mixture was stirred while introducing nitrogen, and the temperature of the liquid was increased to 60° C.

0.5 parts by mass of AQUALON KH-20 as an emulsifier and 6 parts by mass of a 5% ammonium persulfate aqueous solution (0.3 parts by mass of ammonium persulfate) were added to the reaction vessel.

Subsequently, 10 minutes after adding the 5% ammonium persulfate aqueous solution to the reaction vessel, the monomer pre-emulsion was continuously added dropwise from a liquid dropping tank over 5 hours. From another liquid dropping tank, 6 parts of the 5% ammonium persulfate aqueous solution (0.3 parts of ammonium persulfate) was added intermittently dropwise at 70° C. over 5 hours.

After the 5% ammonium persulfate aqueous solution is added dropwise, the mixture was maintained at 70° C. for 3 hours to mature.

Subsequently, the mixture was cooled to 50° C., ammonia water was added, and the mixture was filtered through a 180-mesh polyester filter cloth to obtain Resin Emulsion A.

A part of the obtained Resin Emulsion A was dried at 150° C. during 30 minutes. The solid content concentration was measured in accordance with JIS K5601-1-2 and determined as 50.0%. Further, the glass transition temperature of Resin Emulsion A was measured by the method described below and was determined as 0° C.

Measurement of Glass Transition Temperature (Tg) of Resin Emulsion

Specifically, 4 g of the resin emulsion was filled into a petri dish made of a tetrafluoroethylene/perfluoroalkyl vinyl ether copolymer (PFA) having a diameter of 50 mm and the resin emulsion was spread evenly and dried at 50° C. for one week to obtain a resin film. 5.0 mg of the obtained resin film was filled into a sample container made of aluminum, and the sample container was placed on a holder unit and set in an electric furnace.

Next, in a nitrogen atmosphere, the temperature was raised from 0° C. to 150° C. at a temperature increase rate of 10° C./min, then lowered from 150° C. to −80° C. at a cooling rate of 5° C./min, and raised again to 150° C. at a temperature increase rate of 10° C./min, to obtain a DSC curve.

An analysis program of a DSC-60 system was used to analyze, from the obtained DSC curve, an inflection part during the second temperature increase by the midpoint method to determine the glass transition temperature (Tg).

Preparation Example 2 of Resin Emulsion

Resin Emulsion B was obtained similarly to Preparation Example 1 of the resin emulsion, except that the "55.4 parts by mass of methyl methacrylate" as a monomer and the "44.6 parts by mass of 2-ethylhexyl acrylate" in Preparation Example 1 of the resin emulsion were changed to "66.3 parts by mass of methyl methacrylate" and "33.7 parts by mass of 2-ethylhexyl acrylate". The solid content concentration and the glass transition temperature were measured similarly to the Resin Emulsion A, and the solid content concentration was 50.0% and the glass transition temperature was 20° C.

Preparation Example 3 of Resin Emulsion

Resin Emulsion C was obtained similarly to Preparation Example 1 of the resin emulsion, except that the "55.4 parts by mass of methyl methacrylate" as a monomer and the "44.6 parts by mass of 2-ethylhexyl acrylate" in Preparation Example 1 of the resin emulsion were changed to "63.8 parts by mass of methyl methacrylate" and "36.3 parts by mass of 2-ethylhexyl acrylate". The solid content concentration and the glass transition temperature were measured similarly to the Resin Emulsion A, and the solid content concentration was 50.0% and the glass transition temperature was 15° C.

Preparation Example 4 of Resin Emulsion

Resin Emulsion D was obtained similarly to Preparation Example 1 of the resin emulsion, except that the "55.4 parts by mass of methyl methacrylate" as a monomer and the "44.6 parts by mass of 2-ethylhexyl acrylate" in Preparation Example 1 of the resin emulsion were changed to "49.3 parts by mass of methyl methacrylate" and "50.7 parts by mass of 2-ethylhexyl acrylate". The solid content concentration and the glass transition temperature were measured similarly to the Resin Emulsion A, and the solid content concentration was 50.0% and the glass transition temperature was −10° C.

Preparation Example 5 of Resin Emulsion

Resin Emulsion E was obtained similarly to Preparation Example 1 of the resin emulsion, except that the "55.4 parts by mass of methyl methacrylate" as a monomer and the "44.6 parts by mass of 2-ethylhexyl acrylate" in Preparation Example 1 of the resin emulsion were changed to "35.6 parts by mass of methyl methacrylate" and "64.4 parts by mass of 2-ethylhexyl acrylate". The solid content concentration and the glass transition temperature were measured similarly to the Resin Emulsion A, and the solid content concentration was 50.0% and the glass transition temperature was −30° C.

Preparation Example 6 of Resin Emulsion

Resin Emulsion F was obtained similarly to Preparation Example 1 of the resin emulsion, except that the "55.4 parts by mass of methyl methacrylate" as a monomer and the "44.6 parts by mass of 2-ethylhexyl acrylate" in Preparation Example 1 of the resin emulsion were changed to "7.5 parts by mass of SILA-ACE 210 (vinyltrimethoxysilane, manufactured by Chisso Corporation)", "56.4 parts by mass of methyl methacrylate" and "36.1 parts by mass of 2-ethylhexyl acrylate". The solid content concentration and the glass transition temperature were measured similarly to the Resin Emulsion A, and the solid content concentration was 50.0% and the glass transition temperature was 20° C.

Preparation Example 7 of Resin Emulsion

Resin Emulsion G was obtained similarly to Preparation Example 1 of the resin emulsion, except that the "55.4 parts by mass of methyl methacrylate" as a monomer and the "44.6 parts by mass of 2-ethylhexyl acrylate" in Preparation Example 1 of the resin emulsion were changed to "7.5 parts by mass of SILA-ACE 210 (vinyltrimethoxysilane, manufactured by Chisso Corporation)", "53.8 parts by mass of methyl methacrylate" and "38.7 parts by mass of 2-ethylhexyl acrylate". The solid content concentration and the glass transition temperature were measured similarly to the Resin Emulsion A, and the solid content concentration was 50.0% and the glass transition temperature was 15° C.

Preparation Example 8 of Resin Emulsion

Resin Emulsion H was obtained similarly to Preparation Example 1 of the resin emulsion, except that the "55.4 parts by mass of methyl methacrylate" as a monomer and the "44.6 parts by mass of 2-ethylhexyl acrylate" in Preparation Example 1 of the resin emulsion were changed to "7.5 parts by mass of SILA-ACE 210 (vinyltrimethoxysilane, manufactured by Chisso Corporation)", "45.4 parts by mass of methyl methacrylate" and "47.1 parts by mass of 2-ethylhexyl acrylate". The solid content concentration and the glass transition temperature were measured similarly to the Resin Emulsion A, and the solid content concentration was 50.0% and the glass transition temperature was 0° C.

Example 1

5.0 mass % of propylene glycol and 9.0 mass % of ion-exchanged water as a solvent, 30.0 mass % of Resin Emulsion A as a resin, and 36.0 mass % of Pigment Dispersion as a coloring material were mixed. The mixture was stirred for 30 minutes to obtain a uniform mixture, 36.0 mass % of calcium carbonate (UP-G, manufactured by Imerys Specialties Japan Co., Ltd.) were added as thickening particles, and the obtained mixture was further stirred at high speed for one hour to obtain Ink 1 as a uniform mixture.

In the obtained Ink 1, the particle diameter (P99 in the ISO Max Distance particle size distribution) and the glass transition temperature of a dried film of Ink 1 were measured by the following methods. The particle diameter of Ink 1 was 5.0, and the glass transition temperature of the dried film of Ink 1 was 0° C.

<Viscosity of Ink>

To measure the viscosity of the ink, an MCR 301 (manufactured by Anton Parr GmbH) using a cone plate (cone radius: 25 mm, cone angle: 1°) was used to measure the viscosity (mPa·s) at a shear rate of 1 $s^{-1}$ at 25° C., the viscosity (mPa·s) at a shear rate of 5,000 $s^{-1}$ at 25° C., and the viscosity (mPa·s) at a shear rate of 0.1 $s^{-1}$ at 25° C.

<Measurement of Glass Transition Temperature (Tg) of Dried Film of Ink>

4 g of the ink were filled into a petri dish made of a tetrafluoroethylene/perfluoroalkyl vinyl ether copolymer (PFA) having a diameter of 50 mm and the ink was spread evenly and dried at 50° C. for one week to obtain a dried film of the ink. 5.0 mg of the obtained dried film of the ink was filled into a sample container made of aluminum, and the sample container was placed on a holder unit and set in an electric furnace.

Next, in a nitrogen atmosphere, the temperature was raised from 0° C. to 150° C. at a temperature increase rate of 10° C./min, then lowered from 150° C. to −80° C. at a cooling rate of 5° C./min, and raised again to 150° C. at a temperature increase rate of 10° C./min, to obtain a DSC curve.

An analysis program of a DSC-60 system was used to analyze, from the obtained DSC curve, an inflection part during the second temperature increase by the midpoint method to determine the glass transition temperature (Tg).

<Measurement of P99 in ISO Max Distance Based on Number of Particles in Ink>

0.1 g of ink were diluted in 100 mL of water, and an injection-type image analysis particle size distribution analyzer IF-3200 was used and a setting was selected in which the size of individual particles in the ink can be observed, to measure P99 of the particles in the ink in the ISO Max Distance particle size distribution in a range from 0.1 μm to 100 μm, based on the number of particles in the ink. The amount of dilution varies depending on the amount and size of the particle components in the ink, and thus, it is desirable to adjust the dilution ratio so that the size of each particle in the ink can be observed. If the ink aggregates in water, the ink may be diluted with a solvent that does not cause the ink to aggregate (for example, cyclohexane).

Examples 2 to 32 and Comparative Examples 1 to 3

Ink 2 to Ink 35 were obtained similarly to Example 1, except that the type and the content of the solvent, the resin, the coloring material, and the thickening particles in Example 1 were changed to the compositions illustrated in Table 1 below. Note that the unit of each number in the compositions in Table 1 indicates "mass %".

TABLE 1

| | | Examples | | | | | | |
|---|---|---|---|---|---|---|---|---|
| | | 1 | 2 | 3 | 4 | 5 | 6 | 7 |
| Thickening particles | UP-G (calcium carbonate, solid content: 100 mass %) | 36.0 | 26.0 | 38.0 | 30.0 | 40.0 | — | — |
| | LUMINOUS (calcium carbonate, solid content: 100 mass %) | — | — | — | — | — | 37.0 | — |
| | CALTEX 5 (calcium carbonate, solid content: 100 mass %) | — | — | — | — | — | — | 43.0 |
| | SUPER #2000 (calcium carbonate, solid content: 100 mass %) | — | — | — | — | — | — | — |
| | SUPER SSS (calcium carbonate, solid content: 100 mass %) | — | — | — | — | — | — | — |
| | SUPER SS (calcium carbonate, solid content: 100 mass %) | — | — | — | — | — | — | — |
| | NANO ACE D-600 (talc, solid content: 100 mass %) | — | — | — | — | — | — | — |
| Resin | Resin Emulsion A (Tg: 0° C., solid content: 50 mass %) | 30.0 | 30.0 | 30.0 | 32.0 | 33.0 | 30.0 | 30.0 |
| | Resin Emulsion B (Tg: 20° C., solid content: 50 mass %) | — | — | — | — | — | — | — |
| | Resin Emulsion C (Tg: 15° C., solid content: 50 mass %) | — | — | — | — | — | — | — |
| | Resin Emulsion D (Tg: −10° C., solid content: 50 mass %) | — | — | — | — | — | — | — |
| | Resin Emulsion E (Tg: −30° C., solid content: 50 mass %) | — | — | — | — | — | — | — |
| | Resin Emulsion F (Tg: 20° C., solid content: 50 mass %) | — | — | — | — | — | — | — |
| | Resin Emulsion G (Tg: 15° C., solid content: 50 mass %) | — | — | — | — | — | — | — |
| | Resin Emulsion H (Tg: 0° C., solid content: 50 mass %) | — | — | — | — | — | — | — |
| | TAKELAC W6110 (Tg: −20° C., solid content: 32 mass %) | — | — | — | — | — | — | — |
| | TAKELAC W6061 (Tg: 25° C., solid content: 30 mass %) | — | — | — | — | — | — | — |
| Coloring material | White pigment dispersion | 20.0 | 20.0 | 20.0 | 20.0 | 20.0 | 20.0 | 20.0 |
| | Cyan pigment dispersion | — | — | — | — | — | — | — |
| Solvent | Propylene glycol | 5.0 | 5.0 | 5.0 | 5.0 | 5.0 | 5.0 | 5.0 |
| | 1,3-Butanediol | — | — | — | — | — | — | — |
| | Glycerin | — | — | — | — | — | — | — |
| | Ion-exchanged water | 9.0 | 19.0 | 7.0 | 13.0 | 2.0 | 8.0 | 2.0 |
| Total | | 100.0 | 100.0 | 100.0 | 100.0 | 100.0 | 100.0 | 100.0 |
| Physical property values | Viscosity at 25° C. at shear rate 1 $S^{-1}$ (mPa · s) | 7,000 | 3,000 | 9,000 | 6,000 | 25,000 | 6,000 | 6,810 |
| | Viscosity at 25° C. at shear rate 5,000 $S^{-1}$ (mPa · s) | 70 | 30 | 80 | 60 | 130 | 64 | 70 |
| | Viscosity at 25° C. at shear rate 0.1 $S^{-1}$ (mPa · s) | 30,000 | 9,000 | 70,000 | 24,000 | 130,000 | 65,000 | 40,000 |
| | P99 in ISO Max Distance particle size distribution (μm) | 5 | 5.1 | 4.9 | 5 | 5.1 | 3.5 | 3.7 |
| | Glass transition temperature of dried film (° C.) | 0 | 0 | 0 | 0 | 0 | 0 | 0 |

TABLE 2

| | | Examples | | | | | | |
|---|---|---|---|---|---|---|---|---|
| | | 8 | 9 | 10 | 11 | 12 | 13 | 14 |
| Thickening particles | UP-G (calcium carbonate, solid content: 100 mass %) | — | — | — | 36.0 | 36.0 | 36.0 | 36.0 |
| | LUMINOUS (calcium carbonate, solid content: 100 mass %) | — | — | — | — | — | — | — |
| | CALTEX 5 (calcium carbonate, solid content: 100 mass %) | — | — | — | — | — | — | — |
| | SUPER #2000 (calcium carbonate, solid content: 100 mass %) | 52.0 | — | — | — | — | — | — |
| | SUPER SSS (calcium carbonate, solid content: 100 mass %) | — | 55.0 | — | — | — | — | — |
| | SUPER SS (calcium carbonate, solid content: 100 mass %) | — | — | — | — | — | — | — |
| | NANO ACE D-600 (talc, solid content: 100 mass %) | — | — | 44.0 | — | — | — | — |

TABLE 2-continued

| | | Examples | | | | | | |
|---|---|---|---|---|---|---|---|---|
| | | 8 | 9 | 10 | 11 | 12 | 13 | 14 |
| Resin | Resin Emulsion A (Tg: 0° C., solid content: 50 mass %) | 23.0 | 20.0 | 27.0 | — | — | — | — |
| | Resin Emulsion B (Tg: 20° C., solid content: 50 mass %) | — | — | — | 30.0 | — | — | — |
| | Resin Emulsion C (Tg: 15° C., solid content: 50 mass %) | — | — | — | — | 30.0 | — | — |
| | Resin Emulsion D (Tg: −10° C., solid content: 50 mass %) | — | — | — | — | — | 30.0 | — |
| | Resin Emulsion E (Tg: −30° C., solid content: 50 mass %) | — | — | — | — | — | — | 30.0 |
| | Resin Emulsion F (Tg: 20° C., solid content: 50 mass %) | — | — | — | — | — | — | — |
| | Resin Emulsion G (Tg: 15° C., solid content: 50 mass %) | — | — | — | — | — | — | — |
| | Resin Emulsion H (Tg: 0° C., solid content: 50 mass %) | — | — | — | — | — | — | — |
| | TAKELAC W6110 (Tg: −20° C., solid content: 32 mass %) | — | — | — | — | — | — | — |
| | TAKELAC W6061 (Tg: 25° C., solid content: 30 mass %) | — | — | — | — | — | — | — |
| Coloring material | White pigment dispersion | 20.0 | 20.0 | 20.0 | 20.0 | 20.0 | 20.0 | 20.0 |
| | Cyan pigment dispersion | — | — | — | — | — | — | — |
| Solvent | Propylene glycol | 5.0 | 5.0 | 5.0 | 5.0 | 5.0 | 5.0 | 5.0 |
| | 1,3 Butanediol | — | — | — | — | — | — | — |
| | Glycerin | — | — | — | — | — | — | — |
| | Ion-exchanged water | 0.0 | 0.0 | 4.0 | 9.0 | 9.0 | 9.0 | 9.0 |
| Total | | 100.0 | 100.0 | 100.0 | 100.0 | 100.0 | 100.0 | 100.0 |
| Physical property values | Viscosity at 25° C. at shear rate 1 $S^{-1}$ (mPa · s) | 8,300 | 6,400 | 7,300 | 6,980 | 7,150 | 7,200 | 6,800 |
| | Viscosity at 25° C. at shear rate 5,000 $S^{-1}$ (mPa · s) | 58 | 110 | 79 | 68 | 72 | 66 | 75 |
| | Viscosity at 25° C. at shear rate 0.1 $S^{-1}$ (mPa · s) | 44,000 | 30,000 | 32,000 | 33,000 | 32,000 | 30,500 | 31,000 |
| | P99 in ISO Max Distance particle size distribution (μm) | 5 | 9 | 4.2 | 3 | 3 | 3 | 3 |
| | Glass transition temperature of dried film (° C.) | 0 | 0 | 0 | 20 | 15 | −10 | −30 |

TABLE 3

| | | Examples | | | | | | |
|---|---|---|---|---|---|---|---|---|
| | | 15 | 16 | 17 | 18 | 19 | 20 | 21 |
| Thickening particles | UP-G (calcium carbonate, solid content: 100 mass %) | 36.0 | 36.0 | 36.0 | 36.0 | 36.0 | 36.0 | 36.0 |
| | LUMINOUS (calcium carbonate, solid content: 100 mass %) | — | — | — | — | — | — | — |
| | CALTEX 5 (calcium carbonate, solid content: 100 mass %) | — | — | — | — | — | — | — |
| | SUPER #2000 (calcium carbonate, solid content: 100 mass %) | — | — | — | — | — | — | — |
| | SUPER SSS (calcium carbonate, solid content: 100 mass %) | — | — | — | — | — | — | — |
| | SUPER SS (calcium carbonate, solid content: 100 mass %) | — | — | — | — | — | — | — |
| | NANO ACE D-600 (talc, solid content: 100 mass %) | — | — | — | — | — | — | — |
| Resin | Resin Emulsion A (Tg: 0° C., solid content: 50 mass %) | — | — | — | — | — | 30.0 | 30.0 |
| | Resin Emulsion B (Tg: 20° C., solid content: 50 mass %) | — | — | — | — | — | — | — |
| | Resin Emulsion C (Tg: 15° C., solid content: 50 mass %) | — | — | — | — | — | — | — |
| | Resin Emulsion D (Tg: −10° C., solid content: 50 mass %) | — | — | — | — | — | — | — |
| | Resin Emulsion E (Tg: −30° C., solid content: 50 mass %) | — | — | — | — | — | — | — |
| | Resin Emulsion F (Tg: 20° C., solid content: 50 mass %) | 30.0 | — | — | — | — | — | — |
| | Resin Emulsion G (Tg: 15° C., solid content: 50 mass %) | — | 30.0 | — | — | — | — | — |

TABLE 3-continued

| | | Examples | | | | | | |
|---|---|---|---|---|---|---|---|---|
| | | 15 | 16 | 17 | 18 | 19 | 20 | 21 |
| | Resin Emulsion H (Tg: 0° C., solid content: 50 mass %) | — | — | 30.0 | — | — | — | — |
| | TAKELAC W6110 (Tg: −20° C., solid content: 32 mass %) | — | — | — | 35.0 | — | — | — |
| | TAKELAC W6061 (Tg: 25° C., solid content: 30 mass %) | — | — | — | — | 35.0 | — | — |
| Coloring material | White pigment dispersion | 20.0 | 20.0 | 20.0 | 20.0 | 20.0 | 20.0 | 20.0 |
| | Cyan pigment dispersion | — | — | — | — | — | — | — |
| Solvent | Propylene glycol | 5.0 | 5.0 | 5.0 | 5.0 | 5.0 | — | — |
| | 1,3 Butanediol | — | — | — | — | — | 5.0 | — |
| | Glycerin | — | — | — | — | — | — | 5.0 |
| | Ion-exchanged water | 9.0 | 9.0 | 9.0 | 4.0 | 4.0 | 9.0 | 9.0 |
| Total | | 100.0 | 100.0 | 100.0 | 100.0 | 100.0 | 100.0 | 100.0 |
| Physical property values | Viscosity at 25° C. at shear rate 1 $S^{-1}$ (mPa · s) | 6,800 | 6,800 | 6,800 | 5,400 | 6,300 | 7,200 | 7,900 |
| | Viscosity at 25° C. at shear rate 5,000 $S^{-1}$ (mPa · s) | 72 | 70 | 69 | 65 | 64 | 72 | 74 |
| | Viscosity at 25° C. at shear rate 0.1 $S^{-1}$ (mPa · s) | 30,400 | 32,100 | 31,000 | 27,000 | 27,500 | 31,000 | 34,000 |
| | P99 in ISO Max Distance particle size distribution (μm) | 3 | 3 | 3 | 3 | 3 | 5 | 5 |
| | Glass transition temperature of dried film (° C.) | 20 | 15 | 0 | −20 | 25 | 0 | 0 |

TABLE 4

| | | Examples | | | | | | |
|---|---|---|---|---|---|---|---|---|
| | | 22 | 23 | 24 | 25 | 26 | 27 | 28 |
| Thickening particles | UP-G (calcium carbonate, solid content: 100 mass %) | 36.0 | 36.0 | 36.0 | 36.0 | 36.0 | 31.0 | 27.6 |
| | LUMINOUS (calcium carbonate, solid content: 100 mass %) | — | — | — | — | — | — | — |
| | CALTEX 5 (calcium carbonate, solid content: 100 mass %) | — | — | — | — | — | — | — |
| | SUPER #2000 (calcium carbonate, solid content: 100 mass %) | — | — | — | — | — | — | — |
| | SUPER SSS (calcium carbonate, solid content: 100 mass %) | — | — | — | — | — | — | — |
| | SUPER SS (calcium carbonate, solid content: 100 mass %) | — | — | — | — | — | — | — |
| | NANO ACE D-600 (talc, solid content: 100 mass %) | — | — | — | — | — | — | — |
| Resin | Resin Emulsion A (Tg: 0° C., solid content: 50 mass %) | 30.0 | 30.0 | 30.0 | 30.0 | 30.0 | 16.0 | 36.8 |
| | Resin Emulsion B (Tg: 20° C., solid content: 50 mass %) | — | — | — | — | — | — | — |
| | Resin Emulsion C (Tg: 15° C., solid content: 50 mass %) | — | — | — | — | — | — | — |
| | Resin Emulsion D (Tg: −10° C., solid content: 50 mass %) | — | — | — | — | — | — | — |
| | Resin Emulsion E (Tg: −30° C., solid content: 50 mass %) | — | — | — | — | — | — | — |
| | Resin Emulsion F (Tg: 20° C., solid content: 50 mass %) | — | — | — | — | — | — | — |
| | Resin Emulsion G (Tg: 15° C., solid content: 50 mass %) | — | — | — | — | — | — | — |
| | Resin Emulsion H (Tg: 0° C., solid content: 50 mass %) | — | — | — | — | — | — | — |
| | TAKELAC W6110 (Tg: −20° C., solid content: 32 mass %) | — | — | — | — | — | — | — |
| | TAKELAC W6061 (Tg: 25° C., solid content: 30 mass %) | — | — | — | — | — | — | — |

TABLE 4-continued

| | | Examples | | | | | | |
|---|---|---|---|---|---|---|---|---|
| | | 22 | 23 | 24 | 25 | 26 | 27 | 28 |
| Coloring material | White pigment dispersion | 20.0 | 20.0 | 20.0 | 20.0 | 20.0 | 20.0 | 20.0 |
| | Cyan pigment dispersion | — | — | — | — | — | — | — |
| Solvent | Propylene glycol | 2.5 | — | 7.0 | — | — | 4.0 | 5.0 |
| | 1,3 Butanediol | — | — | — | 7.0 | — | — | — |
| | Glycerin | 2.5 | — | — | — | 7.0 | — | — |
| | Ion-exchanged water | 9.0 | 14.0 | 7.0 | 7.0 | 7.0 | 29.0 | 10.6 |
| Total | | 100.0 | 100.0 | 100.0 | 100.0 | 100.0 | 100.0 | 100.0 |
| Physical property values | Viscosity at 25° C. at shear rate 1 $S^{-1}$ (mPa · s) | 7,400 | 6,200 | 7,300 | 7,500 | 8,100 | 4,000 | 5,300 |
| | Viscosity at 25° C. at shear rate 5,000 $S^{-1}$ (mPa · s) | 72 | 60 | 75 | 77 | 79 | 25 | 56 |
| | Viscosity at 25° C. at shear rate 0.1 $S^{-1}$ (mPa · s) | 32,300 | 26,000 | 33,500 | 35,000 | 38,500 | 12,000 | 18,000 |
| | P99 in ISO Max Distance particle size distribution (μm) | 5 | 5 | 3 | 5 | 5 | 5 | 5 |
| | Glass transition temperature of dried film (° C.) | 0 | 0 | 25 | 0 | 0 | 0 | 0 |

TABLE 5

| | | Examples | | | | Comparative Examples | | |
|---|---|---|---|---|---|---|---|---|
| | | 29 | 30 | 31 | 32 | 1 | 2 | 3 |
| Thickening particles | UP-G (calcium carbonate, solid content: 100 mass %) | 26.0 | 23.0 | 20.0 | 36.0 | 23.0 | 48.0 | — |
| | LUMINOUS (calcium carbonate, solid content: 100 mass %) | — | — | — | — | — | — | — |
| | CALTEX 5 (calcium carbonate, solid content: 100 mass %) | — | — | — | — | — | — | — |
| | SUPER #2000 (calcium carbonate, solid content: 100 mass %) | — | — | — | — | — | — | — |
| | SUPER SSS (calcium carbonate, solid content: 100 mass %) | — | — | — | — | — | — | — |
| | SUPER SS (calcium carbonate, solid content: 100 mass %) | — | — | — | — | — | — | 58.0 |
| | NANO ACE D-600 (talc, solid content: 100 mass %) | — | — | — | — | — | — | — |
| Resin | Resin Emulsion A (Tg: 0° C., solid content: 50 mass %) | 40.0 | 46.0 | 52.0 | 30.0 | 26.0 | 27.0 | 17.0 |
| | Resin Emulsion B (Tg: 20° C., solid content: 50 mass %) | — | — | — | — | — | — | — |
| | Resin Emulsion C (Tg: 15° C., solid content: 50 mass %) | — | — | — | — | — | — | — |
| | Resin Emulsion D (Tg: −10° C., solid content: 50 mass %) | — | — | — | — | — | — | — |
| | Resin Emulsion E (Tg: −30° C., solid content: 50 mass %) | — | — | — | — | — | — | — |
| | Resin Emulsion F (Tg: 20° C., solid content: 50 mass %) | — | — | — | — | — | — | — |
| | Resin Emulsion G (Tg: 15° C., solid content: 50 mass %) | — | — | — | — | — | — | — |
| | Resin Emulsion H (Tg: 0° C., solid content: 50 mass %) | — | — | — | — | — | — | — |
| | TAKELAC W6110 (Tg: −20° C., solid content: 32 mass %) | — | — | — | — | — | — | — |
| | TAKELAC W6061 (Tg: 25° C., solid content: 30 mass %) | — | — | — | — | — | — | — |
| Coloring material | White pigment dispersion | 20.0 | 20.0 | 20.0 | — | 20.0 | 20.0 | 20.0 |
| | Cyan pigment dispersion | — | — | — | 20.0 | — | — | — |
| Solvent | Propylene glycol | 5.0 | 5.0 | 5.0 | 4.0 | 5.0 | 5.0 | 5.0 |
| | 1,3 Butanediol | — | — | — | — | — | — | — |
| | Glycerin | — | — | — | — | — | — | — |
| | Ion-exchanged water | 9.0 | 6.0 | 3.0 | 10.0 | 26.0 | 0.0 | 0.0 |
| Total | | 100.0 | 100.0 | 100.0 | 100.0 | 100.0 | 100.0 | 100.0 |
| Physical property values | Viscosity at 25° C. at shear rate 1 $S^{-1}$ (mPa · s) | 4,600 | 4,000 | 3,100 | 6,500 | 2,000 | 35,000 | 5,000 |
| | Viscosity at 25° C. at shear rate 5,000 $S^{-1}$ (mPa · s) | 52 | 49 | 45 | 65 | 21 | 206 | 170 |
| | Viscosity at 25° C. at shear rate 0.1 $S^{-1}$ (mPa · s) | 15,000 | 12,000 | 9,100 | 30,500 | 6,000 | 410,000 | 14,000 |

TABLE 5-continued

| | Examples | | | | Comparative Examples | | |
|---|---|---|---|---|---|---|---|
| | 29 | 30 | 31 | 32 | 1 | 2 | 3 |
| P99 in ISO Max Distance particle size distribution (μm) | 5 | 5 | 5 | 5 | 5 | 4.9 | 10.9 |
| Glass transition temperature of dried film (° C.) | 0 | 0 | 0 | 0 | 0 | 0 | 0 |

The components in Tables 1 to 5 are described in detail below.

—Thickening Particles—

UP-G (manufactured by Imerys Specialties Japan Co., Ltd., solid content 100%)

LUMINOUS (manufactured by Maruo Calcium Co., Ltd., solid content 100%)

CALTEX 5 (manufactured by Maruo Calcium Co., Ltd., solid content 100%)

SUPER #2000 (manufactured by Maruo Calcium Co., Ltd., solid content 100%)

SUPER SSS (manufactured by Maruo Calcium Co., Ltd., solid content 100%)

SUPER SS (manufactured by Maruo Calcium Co., Ltd., solid content 100%)

NANO ACE D-600 (manufactured by Nippon Talc Co., Ltd., solid content 100%)

—Resin—

TAKELAC W6110 (manufactured by Mitsui Chemicals, Inc., polycarbonate urethane resin particles, Tg: −20° C., solid content 32%)

TAKELAC W6061 (manufactured by Mitsui Chemicals, Inc., polycarbonate urethane resin particles, Tg: 25° C., solid content 30%)

In Ink 1 to Ink 35 in Examples 1 to 32 and Comparative Examples 1 to 3, the “discharge stability”, the “concealability”, the “cracks in the coating film”, the “drying properties of the coating film”, the “robustness of the coating film” and the “scattering of ink” were evaluated. The results are illustrated in Table 6.

<Discharge Stability>

Ink 1 to Ink 35 of Examples 1 to 32 and Comparative Examples 1 to 3 were placed in a LETTEROBO head (a head installed in a LETTEROBO, manufactured by Ricoh Digital Painting Co., Ltd.) and each ink was discharged, to evaluate the discharge stability, based on the following evaluation criteria. An evaluation result of the discharge stability of “B” or higher is within a range usable in practice.

[Evaluation Criteria]

A: No deflection or instability in the discharge, stable discharge of ink is possible B: Slight deflection or instability occur in the discharge, but stable discharge of ink is possible C: Deflection, instability, and the like occur in the discharge, stable discharge of ink is impossible D: Discharge of ink is impossible <Concealability>

Ink 1 to Ink 35 of Examples 1 to 32 and Comparative Examples 1 to 3 were placed in the printing apparatus illustrated in FIGS. 3 and 4 to which a LETTEROBO head (a head installed in a LETTEROBO, manufactured by Ricoh Digital Painting Co., Ltd.) was attached. Each ink was discharged to print a solid image on a glass plate. After confirming that the film thickness of a dried film was 300 μm, the solid image was printed on porous asphalt in a manner similar to the glass plate. Afterwards, the printed products were allowed to stand for 24 hours at a temperature of 23° C. and a humidity of 50%, and the concealability was evaluated based on the following evaluation criteria. An evaluation result of the concealability of “C” or higher is within a range usable in practice.

[Evaluation Criteria]

A: A flat part of the asphalt surface and a grounding in porous holes visible from the surface are concealed very well B: The flat part of the asphalt surface and the grounding in the porous holes visible from the surface are well concealed C: A grounding of the flat part of the asphalt surface is well concealed, but the grounding in the porous holes visible from the surface is not concealed D: The flat part of the asphalt surface and the grounding in the porous holes visible from the surface are not concealed <Cracks in Coating Film>

Ink 1 to Ink 35 of Examples 1 to 32 and Comparative Examples 1 to 3 were placed in the printing apparatus illustrated in FIGS. 3 and 4 to which a LETTEROBO head (a head installed in a LETTEROBO, manufactured by Ricoh Digital Painting Co., Ltd.) was attached. Each ink was discharged to form, on a glass plate, coating films of a solid image having a film thickness after drying of 100 μm, 200 μm, and 300 μm. The solid image was kept at a temperature of 23° C. and a humidity of 50% for 24 hours, and then, the coating film was visually observed for cracks under diffused daylight. The cracks in the coating film were evaluated based on the following evaluation criteria.

[Evaluation Criteria]

A: No cracks in coating films of 100 μm, 200 μm, and 300 μm

B: No cracks in coating films of 100 μm and 200 μm, but cracks in coating film of 300 μm C: No cracks in coating film of 100 μm, but cracks in coating films of 200 μm and 300 μm <Drying Properties of Coating Film>

Ink 1 to Ink 35 of Examples 1 to 32 and Comparative Examples 1 to 3 were placed in the printing apparatus illustrated in FIGS. 3 and 4 to which a LETTEROBO head (a head installed in a LETTEROBO, manufactured by Ricoh Digital Painting Co., Ltd.) was attached. Each ink was discharged to form, on a glass plate, a coating film of a solid image having a film thickness after drying of 200 μm.

Afterwards, the coating film was dried by blowing hot air using a hot air device at a temperature of 40° C. and a blowing speed of 5 m/s.

Subsequently, a No Pickup Time Tester (manufactured by TP Giken Co., Ltd.), which is a test roll including a smooth synthetic rubber tire having a weight of 15.8 kg, was used to roll over the coating film of the solid image. The drying time until the coating film did not adhere any more to the tire was measured, and the drying properties of the coating film were evaluated based on the following evaluation criteria.

[Evaluation Criteria]

A: Drying time of 5 minutes or less

B: Drying time of more than 5 minutes and less than 10 minutes

C: Drying time of more than 10 minutes and less than 15 minutes

<Robustness>

Ink 1 to Ink 35 of Examples 1 to 32 and Comparative Examples 1 to 3 were placed in the printing apparatus illustrated in FIGS. 3 and 4 to which a LETTEROBO head (a head installed in a LETTEROBO, manufactured by Ricoh Digital Painting Co., Ltd.) was attached. Each ink was discharged to form, on a glass plate, a coating film of a solid image having a film thickness after drying of 100 μm. Afterwards, the coating film was dried by blowing hot air for 15 minutes using a hot air device at a temperature of 40° C. and a blowing speed of 5 m/s.

Afterwards, the center of the surface of the coating film of the dried solid image was rapidly and repeatedly rubbed with a fingernail, and the robustness was evaluated based on the following evaluation criteria.

[Evaluation Criteria]

A: Surface of coating film is not scraped at all

B: Surface of coating film is almost not scraped

C: Surface of coating film is slightly scraped, but grounding is not exposed

D: Surface of coating film peels off and grounding is exposed

<Scattering of Ink>

Ink 1 to Ink 35 of Examples 1 to 32 and Comparative Examples 1 to 3 were placed in the printing apparatus illustrated in FIGS. 3 and 4 to which a LETTEROBO head (a head installed in a LETTEROBO, manufactured by Ricoh Digital Painting Co., Ltd.) was attached. Each ink was discharged at distances of 10 mm, 50 mm, and 100 mm between the glass and the discharge port of the nozzle of the head, to form, on a glass plate, a coating film of a solid image having a film thickness after drying of 200 μm. The scattering of ink at each distance was visually observed, and the scattering of the ink was evaluated based on the following evaluation criteria.

[Evaluation Criteria]

A: No ink is scattered at 10 mm, 50 mm, and 100 mm

B: No ink is scattered at 10 mm and 50 mm, but ink is slightly scattered at 100 mm C: No ink is scattered at 10 mm, but slight ink is slightly scattered at 50 mm

TABLE 6

| | | Evaluation results | | | | | |
|---|---|---|---|---|---|---|---|
| | Ink No. | Discharge stability | Concealability | Cracks in coating film | Drying properties of coating film | Robustness of coating film | Scattering of ink |
| Example 1 | 1 | A | A | A | A | A | A |
| Example 2 | 2 | A | C | A | B | A | C |
| Example 3 | 3 | A | A | A | A | A | A |
| Example 4 | 4 | A | B | A | B | A | B |
| Example 5 | 5 | B | A | B | A | A | A |
| Example 6 | 6 | A | A | A | A | A | A |
| Example 7 | 7 | A | A | A | A | A | A |
| Example 8 | 8 | A | A | A | A | A | A |
| Example 9 | 9 | B | A | A | A | B | A |
| Example 10 | 10 | A | A | A | A | A | A |
| Example 11 | 11 | A | A | C | A | A | A |
| Example 12 | 12 | A | A | B | A | A | A |
| Example 13 | 13 | A | A | A | A | A | A |
| Example 14 | 14 | A | A | A | A | A | A |
| Example 15 | 15 | A | A | C | A | A | A |
| Example 16 | 16 | A | A | B | A | A | A |
| Example 17 | 17 | A | A | A | A | A | A |
| Example 18 | 18 | A | B | A | A | B | B |
| Example 19 | 19 | A | B | C | A | B | B |
| Example 20 | 20 | A | A | A | A | A | A |
| Example 21 | 21 | A | A | A | A | A | A |
| Example 22 | 22 | A | A | A | A | A | A |
| Example 23 | 23 | B | B | A | A | A | B |
| Example 24 | 24 | A | A | A | B | A | A |
| Example 25 | 25 | A | A | A | B | A | A |
| Example 26 | 26 | A | A | A | B | A | A |
| Example 27 | 27 | B | C | A | C | A | C |
| Example 28 | 28 | A | C | A | B | A | C |
| Example 29 | 29 | A | C | A | B | B | C |
| Example 30 | 30 | A | C | A | B | B | C |
| Example 31 | 31 | A | C | A | B | C | C |
| Example 32 | 32 | A | A | A | A | A | A |
| Comparative Example 1 | 33 | C | D | A | C | A | C |
| Comparative Example 2 | 34 | D | — | — | — | — | — |
| Comparative Example 3 | 35 | D | — | — | — | — | — |

Aspects of the present embodiment include the following aspects, for example.

According to a first aspect, an ink includes a solvent, a resin, and thickening particles, the ink has a viscosity of $3.00 \times 10^3$ mPa·s or more and $2.50 \times 10^4$ mPa·s or less at 25° C. at a shear rate of 1 $s^{-1}$, and a viscosity of 130 mPa·s or less at 25° C. at a shear rate of 5,000 $s^{-1}$.

In a second aspect, the ink according to the first aspect has a viscosity of $6.00 \times 10^3$ mPa·s or more and $2.50 \times 10^4$ mPa·s or less at 25° C. at a shear rate of 1 $s^{-1}$.

In a third aspect, the ink according to any one of the first aspect and the second aspect has a viscosity of $3.00 \times 10^4$ mPa·s or more at 25° C. at a shear rate of 0.1 $s^{-1}$.

In a fourth aspect, the ink according to any one of the first aspect to the third aspect has a viscosity of 30 mPa·s or more and 80 mPa·s or less at 25° C. at a shear rate of 5,000 $s^{-1}$.

In a fifth aspect, the ink according to any one of the first aspect to the fourth aspect in which P99 in a range of 0.1 μm or more and 100 μm or less in an ISO Max Distance particle size distribution based on number of particles is 9 μm or less.

According to a sixth aspect, in the ink according to any one of the first aspect to the fifth aspect, a solid content in the ink is 45 mass % or more.

According to a seventh aspect, in the ink according to any one of the first aspect to the sixth aspect, the resin has a glass transition temperature Tg of 15° C. or less, or a dried film of the ink has a glass transition temperature of 15° C. or less.

According to an eighth aspect, in the ink according to any one of the first aspect to the seventh aspect, the solvent includes at least one of a dihydric alcohol and a trihydric alcohol.

According to a ninth aspect, in the ink according to any one of the first aspect to the eighth aspect, a content of the thickening particles is 20.0 mass % or more and 55.0 mass % or less with respect to the ink.

According to a tenth aspect, in the ink according to any one of the first aspect to the ninth aspect, a content ratio (A/B) of a content (A) of the thickening particles to a solid content (B) of the resin is 0.8 or more.

According to an eleventh aspect, in the ink according to any one of the first aspect to the tenth aspect, the thickening particles include at least one of calcium carbonate and talc.

According to a twelfth aspect, the ink according to any one of the first aspect to the eleventh aspect is used to coat at least one of a road surface, a wall surface of a building including an exterior wall and an interior wall, a wall surface of a civil engineering structure including a bridge and a tunnel, and a porous base material.

According to a thirteenth aspect, a printing apparatus includes: the ink according to any one of the first aspect to the twelfth aspect; and a discharge unit to discharge the ink from an inkjet nozzle.

According to a fourteenth aspect, in the printing apparatus according to the thirteenth aspect, the discharge unit includes an ink chamber storing the ink, a nozzle hole to discharge the ink being pressurized and supplied from the ink chamber, and a needle valve that is provided in the ink chamber to open and close the nozzle hole to control discharge of the ink.

According to a fifteenth aspect, a printing method includes discharging the ink according to any one of the first aspect to the twelfth aspect from an inkjet nozzle.

According to a sixteenth aspect, in the printing method according to the fifteenth aspect, the discharging includes: supplying the ink being pressurized to a nozzle hole from an ink chamber storing the ink; and opening and closing the nozzle hole by a needle valve to control discharge of the ink.

According to a seventeenth aspect, in the printing method according to the sixteenth aspect, the discharging further includes: discharging the ink from the nozzle hole onto a printing material, a distance between a discharge port of the nozzle hole and the printing material is 50 mm or more.

According to an eighteenth aspect, a printed matter includes a printing object and a printed layer including a resin and thickening particles and being formed on the printing object by the printing apparatus according to the thirteenth aspect or the fourteenth aspect.

According to the ink according to any one of the first to twelfth aspects, the printing apparatus according to any one of the thirteenth aspect and the fourteenth aspect, the printing method according to any one of the fifteenth to seventeenth aspects, and the printed matter according to the eighteenth aspect, it is possible to solve the above-described conventional problems and achieve the object of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An ink comprising:

a solvent;

a coloring material, the coloring material comprising a pigment or a dye;

a resin; and thickening particles dispersed in the ink, wherein a content of the thickening particles is 36.0 mass % or more and 55.0 mass % or less with respect to a total amount of the ink, the ink has a viscosity of $3.00 \times 10^3$ mPa·s or more and $2.50 \times 10^4$ mPa·s or less at 25° C. at a shear rate of 1 $s^{-1}$, a viscosity of 130 mPa·s or less at 25° C. at a shear rate of 5,000 $s^{-1}$, and a viscosity of $3.00 \times 10^4$ mPa·s or more at 25° C. at a shear rate of 0.1 $s^{-1}$, and the thickening particles consist of calcium carbonate or talc.

2. The ink according to claim 1, wherein the ink has a viscosity of $6.00 \times 10^3$ mPa·s or more and $2.50 \times 10^4$ mPa·s or less at 25° C. at a shear rate of 1 $s^{-1}$.

3. The ink according to claim 1, wherein the ink has a viscosity of 30 mPa·s or more and 80 mPa·s or less at 25° C. at a shear rate of 5,000 $s^{-1}$.

4. The ink according to claim 1, wherein P99 in a range of 0.1 μm or more and 100 μm or less in an ISO Max Distance particle size distribution based on number of particles is 9 μm or less.

5. The ink according to claim 1, wherein a solid content in the ink is 45 mass % or more.

6. The ink according to claim 1, wherein the resin has a glass transition temperature Tg of 15° C. or less, or a dried film of the ink has a glass transition temperature of 15° C. or less.

7. The ink according to claim 1, wherein the solvent includes at least one of a dihydric alcohol and a trihydric alcohol.

8. The ink according to claim 1, wherein a content ratio (A/B) of a content (A) of the thickening particles to a solid content (B) of the resin is 0.8 or more.

9. The ink according to claim 1, wherein the ink is used to coat at least one of a road surface, a wall surface of a building including an exterior wall and an interior wall, a wall surface of a civil engineering structure including a bridge and a tunnel, and a porous base material.

10. A printing apparatus comprising:

the ink according to claim 1; and a discharge unit to discharge the ink from an inkjet nozzle.

11. The printing apparatus according to claim 10, wherein the discharge unit includes:

an ink chamber storing the ink;

a nozzle hole to discharge the ink being pressurized and supplied from the ink chamber; and a needle valve provided in the ink chamber, to open and close the nozzle hole to control discharge of the ink.

12. A printing method comprising discharging the ink according to claim 1 from an inkjet nozzle.

13. The printing method according to claim 12, wherein the discharging includes:

supplying the ink being pressurized to a nozzle hole from an ink chamber storing the ink; and opening and closing the nozzle hole by a needle valve to control discharge of the ink.

14. The printing method according to claim 13, wherein the discharging further includes:

discharging the ink from the nozzle hole onto a printing material, a distance between a discharge port of the nozzle hole and the printing material is 50 mm or more.

15. A printed matter comprising:

a printing object; and a printed layer including a resin and thickening particles and being formed on the printing object by the printing apparatus according to claim 10.

16. The ink according to claim 1, wherein the ink has a viscosity of 60 mPa·s or more and 130 mPa·s or less at 25° C. at a shear rate of 5,000 $s^{-1}$.

* * * * *